US006993492B2

(12) United States Patent
George et al.

(10) Patent No.: US 6,993,492 B2
(45) Date of Patent: Jan. 31, 2006

(54) METHOD FOR DETERMINING AND ELIMINATING THE DRIVERS OF NON-VALUE ADDED COST DUE TO PRODUCT COMPLEXITY AND PROCESS PARAMETERS

(75) Inventors: Michael L. George, 3605 Beverly Dr., Dallas, TX (US) 75205; James M. Patell, Stanford, CA (US); Lars F. Maaseidvaag, Elmwood Park, IL (US); Mark A. Sherman, Waco, TX (US)

(73) Assignee: Michael L. George, Dallas, TX (US)

( * ) Notice: Subject to any disclaimer, the term of this patent is extended or adjusted under 35 U.S.C. 154(b) by 0 days.

(21) Appl. No.: 10/705,498

(22) Filed: Nov. 10, 2003

(65) Prior Publication Data

US 2004/0260592 A1 Dec. 23, 2004

Related U.S. Application Data

(60) Provisional application No. 60/479,333, filed on Jun. 18, 2003.

(51) Int. Cl.
*G06F 17/60* (2006.01)

(52) U.S. Cl. ........................................................ 705/8
(58) Field of Classification Search ................... 705/8, 705/1, 10; 700/100, 101
See application file for complete search history.

(56) References Cited

U.S. PATENT DOCUMENTS

| 5,195,041 | A | * | 3/1993 | George et al. | ............... | 700/100 |
| 5,351,195 | A | * | 9/1994 | Sherman | ..................... | 700/100 |
| 6,633,791 | B1 | * | 10/2003 | Lo et al. | ..................... | 700/101 |

OTHER PUBLICATIONS

Bolch, Gunter, Greiner, Stefan, deMeer, Herman, Trivedi, Kishor, Queueing Networks and Markov Chains John Wiley & Sons, 1998, ISBN: 047119366, Chapters 3, 6, 7 and 13.*

Koehn, William K., Robust Design Through Design to Six Sigma Manufacturability 1995 Engineering Management Conference, IEEE 1995, pp. 241-246.*

Rummel, Jeffrey, An empirical investigation of costs in batching decisions Decision Sciences, vol. 31, No. 1, Winter 2000, pp. 79-103.*

Darlington, Jon, Lean thinking and mass customization: The relapship between product and costs Management Accounting, vol. 77, No. 10, Nov. 1999, pp. 18-21.*

Michael, George, Lean Six Sigma: Combining Six Sigma Quality with Lean Speed McGraw-Hill, Apr. 2002, ISBN: 0071385215.*

(Continued)

*Primary Examiner*—Susanna M. Diaz
*Assistant Examiner*—Scott L. Jarrett
(74) *Attorney, Agent, or Firm*—Gardere Wynne Sewell LLP

(57) ABSTRACT

A method for measuring and reducing the cost of complexity in producing products or providing a service by comparing selected non-value added steps in the manufacturing or service process with the number of different products or services provided, so as to provide the non-value added cost of the product or service for various selected complexities. The number of products required to be processed or held in inventory for a particular demand, or the number of different specific services required for a particular demand of the service is determined by comparing the number of different product part numbers, or service categories offered, with selected non-value added steps in the respective processes. Mathematical analyses are derived from equations of motion of process improvement including the first derivative of process velocity.

10 Claims, 28 Drawing Sheets

OTHER PUBLICATIONS

Hines, Peter, Rich, Nick, The seven value stream mapping tools International Journal of Operations & Production Management, vol. 17, Issue 1, Nov. 1997.*

Lee, Hau L., Tang, Christopher S., Modeling the Costs and Benefits of Delayed Product Differentiation Management Science, vol. 43, Issue 1, Jan. 1997, pp. 40-53.*

Yang, Jiaqin, Deane, Richard H., A lotsize reduction model for just-in-time manufacturing systems Integrated Manufacturing Systems, 2002, vol. 13, Issue 7, pp. 471-488.*

Bao, Han P., Samarch, J.A., Affordable Design: A methodology to implement process-based manufacturing cost models into the traditional performance-focused multidisciplinary design optimization,American Institute of Aeronautics and Astronautices.*

Herrmann, Jeffrey, Chincholkar, Mandar M., Design For Production: A tool for reducing manufacturing cycle time Proceedings of DETC 2000, 2000 ASME Design Engineering Technical Conference, Baltimore Maryland.*

Caramanis, Michael C., Anli, Osman M., Dynamic Lead Time Modeling for JIT Production Planning Proceedings of the 1999 IEEE International Conference on Robotics 7 Automation, Detroit Michigan 1999.*

Caramanis, Michael C., Pan, Haidong, Anli, Osman M., A Closed-Loop Approach to Efficient and Stable Supply-Chain Coordination in Complex Stochastic Manufacturing Systems Proceedings of the American Control Conference, Arlington VA 2001, pp. 1381-1388.*

Herrmann, Jeffrey W., Chincholkar, Mandar M., Reducing Throughput Time during Product Design Institute for Systems Research, University of Maryland, Aug. 13, 2001, pp. 1-25.*

Dobson, Gregory, Karmarkar, Uday S., Rummel, Jeffrey L., Batching to Minimize Flow Times on One Machine Management Science, Jun. 1987, vol. 33, Issue 6, pp. 784-799.*

Nahmias, Steven, Production and Operations Analysis, ©2005, 2 pp., McGraw-Hill Irwin, NY, NY. 5th Edition, pp. 202-203.

Chase, Richard B., et al., Production and Operations Management, Manufacturing and Services, Eighth Edition, ©1998, pp. 590-591, Irwin McGraw-Hill, United States of America, p. 590-591.

Roundy, Robin, A 98% Effective Lot-Sizing Rule For a Multi-Product, Multi-Stage Production/Inventory Sys., Mathematics of Operations Research, Nov., 1986, pp. 699-727, vol. 11, No. 4. The Institute of Management Sciences/Operations Research Society of America, U.S.A.

Roundy, Robin, 98% Effective Integer-Ratio Lot-Sizing for One-Warehouse Multi-Retailer Systems, Management Science, Nov. 1985, pp. 1416-1430, vol. 31, No. 11, U.S.A.

Anupindi, Ravi, et al., Managing Business Process Flows, Principles of Operations Management, ©2006, 1999, Pearson Education, Inc. Upper Saddle River, NJ, p. 50.

* cited by examiner

| From | To |  | WS1 | WS2 | WS3 |
|---|---|---|---|---|---|
| 0 | 1 |  | SA | PC | PB |
| 1 | 2 |  | PA | PC | PB |
| 2 | 3 |  | PA | PC | SC |
| 3 | 4 | One Workstation Turnover Cycle for Station 1 | PA | SA | PC |
| 4 | 5 |  | SB | PA | PC |
| 5 | 6 |  | PB | PA | PC |
| 6 | 7 |  | PB | PA | SA |
| 7 | 8 |  | PB | SB | PA |
| 8 | 9 |  | SC | PB | PA |
| 9 | 10 |  | PC | PB | PA |
| 10 | 11 |  | PC | PB | SB |
| 11 | 12 |  | PC | SC | PB |
| 12 | 13 |  | SA | PC | PB |
| 13 | 14 |  | PA | PC | PB |
| 14 | 15 |  | PA | PC | SC |
| 15 | 16 |  | PA | SA | PC |
| 16 | 17 |  | SB | PA | PC |
| 17 | 18 |  | PB | PA | PC |
| 18 | 19 |  | PB | PA | SA |
| 19 | 20 |  | PB | SB | PA |
| 20 | 21 |  | SC | PB | PA |
| 21 | 22 | One Workstation Turnover Cycle for Station 3 | PC | PB | PA |
| 22 | 23 |  | PC | PB | SB |
| 23 | 24 |  | PC | SC | PB |
| 24 | 25 |  | SA | PC | PB |
| 25 | 26 |  | PA | PC | PB |
| 26 | 27 |  | PA | PC | SC |
| 27 | 28 |  | PA | SA | PC |
| 28 | 29 |  | SB | PA | PC |
| 29 | 30 |  | PB | PA | PC |
| 30 | 31 |  | PB | PA | SA |
| 31 | 32 |  | PB | SB | PA |

Perfectly Synchronized Production Schedule

FIG. 8

RAW MATERIAL INVENTORY IN FRONT OF THE FIRST STATION, SYNCHRONIZED PRODUCTION

WORK IN PROCESS INVENTORY BETWEEN STATIONS 1 AND 2, SYNCHRONIZED PRODUCTION

FINISHED GOODS INVENTORY, SYNCHRONIZED PRODUCTION

| From | To | | WS1 | WS2 | WS3 |
|---|---|---|---|---|---|
| 0 | 1 | | SA | SC | SB |
| 1 | 2 | | PA | PC | PB |
| 2 | 3 | | PA | PC | PB |
| 3 | 4 | One Workstation Turnover Cycle for Station 1 | PA | PC | PB |
| 4 | 5 | | SB | SA | SC |
| 5 | 6 | | PB | PA | PC |
| 6 | 7 | | PB | PA | PC |
| 7 | 8 | | PB | PA | PC |
| 8 | 9 | | SC | SB | SA |
| 9 | 10 | | PC | PB | PA |
| 10 | 11 | | PC | PB | PA |
| 11 | 12 | | PC | PB | PA |
| 12 | 13 | | SA | SC | SB |
| 13 | 14 | | PA | PC | PB |
| 14 | 15 | | PA | PC | PB |
| 15 | 16 | | PA | PC | PB |
| 16 | 17 | | SB | SA | SC |
| 17 | 18 | | PB | PA | PC |
| 18 | 19 | | PB | PA | PC |
| 19 | 20 | | PB | PA | PC |
| 20 | 21 | | SC | SB | SA |
| 21 | 22 | | PC | PB | PA |
| 22 | 23 | | PC | PB | PA |
| 23 | 24 | One Workstation Turnover Cycle for Station 3 | PC | PB | PA |
| 24 | 25 | | SA | SC | SB |
| 25 | 26 | | PA | PC | PB |
| 26 | 27 | | PA | PC | PB |
| 27 | 28 | | PA | PC | PB |
| 28 | 29 | | SB | SA | SC |
| 29 | 30 | | PB | PA | PC |
| 30 | 31 | | PB | PA | PC |
| 31 | 32 | | PB | PA | PC |

Setup-On-Batch-Arrival Production Schedule

FIG. 13

RAW MATERIAL INVENTORY IN FRONT OF THE FIRST STATION, SETUP-ON-BATCH-ARRIVAL SCHEDULE

WORK IN PROCESS INVENTORY BETWEEN STATIONS 1 AND 2, SETUP-ON-BATCH-ARRIVAL SCHEDULE

AGGREGATE INVENTORY LEVELS, SETUP-ON-BATCH-ARRIVAL SCHEDULE

| From | To | | WS1 | WS2 | WS3 |
|---|---|---|---|---|---|
| 0 | 1 | | SA | SB | SC |
| 1 | 2 | | PA | PB | PC |
| 2 | 3 | | PA | PB | PC |
| 3 | 4 | | PA | PB | PC |
| 4 | 5 | One Workstation Turnover Cycle for Station 1 | SB | SC | SA |
| 5 | 6 | | PB | PC | PA |
| 6 | 7 | | PB | PC | PA |
| 7 | 8 | | PB | PC | PA |
| 8 | 9 | | SC | SA | SB |
| 9 | 10 | | PC | PA | PB |
| 10 | 11 | | PC | PA | PB |
| 11 | 12 | | PC | PA | PB |
| 12 | 13 | | SA | SB | SC |
| 13 | 14 | | PA | PB | PC |
| 14 | 15 | | PA | PB | PC |
| 15 | 16 | | PA | PB | PC |
| 16 | 17 | | SB | SC | SA |
| 17 | 18 | | PB | PC | PA |
| 18 | 19 | | PB | PC | PA |
| 19 | 20 | One Workstation Turnover Cycle for Station 3 | PB | PC | PA |
| 20 | 21 | | SC | SA | SB |
| 21 | 22 | | PC | PA | PB |
| 22 | 23 | | PC | PA | PB |
| 23 | 24 | | PC | PA | PB |
| 24 | 25 | | SA | SB | SC |
| 25 | 26 | | PA | PB | PC |
| 26 | 27 | | PA | PB | PC |
| 27 | 28 | | PA | PB | PC |
| 28 | 29 | | SB | SC | SA |
| 29 | 30 | | PB | PC | PA |
| 30 | 31 | | PB | PC | PA |
| 31 | 32 | | PB | PC | PA |

Moderately Asynchronized Production Schedule

FIG. 18

RAW MATERIAL INVENTORY IN FRONT OF THE FIRST STATION, MODERATELY ASYNCHRONIZED SCHEDULE

WORK IN PROCESS INVENTORY BETWEEN STATIONS 1 AND 2, MODERATELY ASYNCHRONIZED SCHEDULE

FINISHED GOODS INVENTORY, MODERATELY ASYNCHRONIZED SCHEDULE

AGGREGATE INVENTORY LEVELS, MODERATELY ASYNCHRONIZED SCHEDULE

| From | To | | WS1 | WS2 | WS3 |
|---|---|---|---|---|---|
| 0 | 1 | | SA | SA | SA |
| 1 | 2 | | PA | PA | PA |
| 2 | 3 | | PA | PA | PA |
| 3 | 4 | One | PA | PA | PA |
| 4 | 5 | Workstation | SB | SB | SB |
| 5 | 6 | Turnover | PB | PB | PB |
| 6 | 7 | Cycle for | PB | PB | PB |
| 7 | 8 | all Stations | PB | PB | PB |
| 8 | 9 | | SC | SC | SC |
| 9 | 10 | | PC | PC | PC |
| 10 | 11 | | PC | PC | PC |
| 11 | 12 | | PC | PC | PC |
| 12 | 13 | | SA | SA | SA |
| 13 | 14 | | PA | PA | PA |
| 14 | 15 | | PA | PA | PA |
| 15 | 16 | | PA | PA | PA |
| 16 | 17 | | SB | SB | SB |
| 17 | 18 | | PB | PB | PB |
| 18 | 19 | | PB | PB | PB |
| 19 | 20 | | PB | PB | PB |
| 20 | 21 | | SC | SC | SC |
| 21 | 22 | | PC | PC | PC |
| 22 | 23 | | PC | PC | PC |
| 23 | 24 | | PC | PC | PC |
| 24 | 25 | | SA | SA | SA |
| 25 | 26 | | PA | PA | PA |
| 26 | 27 | | PA | PA | PA |
| 27 | 28 | | PA | PA | PA |
| 28 | 29 | | SB | SB | SB |
| 29 | 30 | | PB | PB | PB |
| 30 | 31 | | PB | PB | PB |
| 31 | 32 | | PB | PB | PB |

Fully Asynchronized Production Schedule

FIG. 23

| Schedule Case | Minimum Aggregate Inventory | Maximum Aggregate Inventory |
|---|---|---|
| 1. Perfectly Synchronized | 18.5 | 27.5 |
| 2. Setup-on-Batch-Arrival | 23.0 | 32.0 |
| 3. Moderately Asychronized | 41.0 | 50.0 |
| 4. Fully Asynchronized | 59.0 | 68.0 |

Comparison of Aggregate Inventory Levels

FIG. 25

Total Average WIP Calculations

| | | \multicolumn{6}{c}{Number of Fast Movers} |
|---|---|---|---|---|---|---|---|
| | | 2 | 3 | 4 | 5 | 6 | 7 |
| | 0 | 1000 | 1500 | 2000 | 2500 | 3000 | 3500 |
| | 1 | 1164 | 1695 | 2220 | 2741 | 3259 | 3776 |
| | 2 | 1341 | 1903 | 2452 | 2994 | 3530 | 4062 |
| | 3 | 1530 | 2123 | 2695 | 3257 | 3812 | 4359 |
| Number | 4 | 1731 | 2352 | 2950 | 3531 | 4102 | 4666 |
| of | 5 | 1945 | 2595 | 3215 | 3818 | 4405 | 4983 |
| Slow | 6 | 2171 | 2849 | 3491 | 4112 | 4716 | 5309 |
| Movers | 7 | 2410 | 3114 | 3779 | 4417 | 5038 | 5646 |
| | 8 | 2659 | 3391 | 4078 | 4734 | 5370 | 5990 |
| | 9 | 2922 | 3680 | 4387 | 5062 | 5712 | 6346 |
| | 10 | 3200 | 3980 | 4710 | 5400 | 6065 | |
| | 11 | 3483 | 4292 | 5039 | 5747 | | |
| | 12 | 3781 | 4614 | 5380 | | | |
| | 13 | 4092 | 4948 | | | | |
| | 14 | 4414 | | | | | |

Total Average WIP for the Complex Facility

FIG. 26

Total Average WIP Calculations (cont.)

| | | \multicolumn{8}{c}{Number of Fast Movers} |
|---|---|---|---|---|---|---|---|---|---|
| | | 8 | 9 | 10 | 11 | 12 | 13 | 14 | 15 |
| | 0 | 4000 | 4500 | 5000 | 5500 | 6000 | 6500 | 7000 | 7500 |
| | 1 | 4291 | 4803 | 5316 | 5826 | 6336 | 6846 | 7356 | 7863 |
| | 2 | 4591 | 5117 | 5641 | 6163 | 6683 | 7203 | 7720 | |
| | 3 | 4902 | 5441 | 5976 | 6509 | 7040 | 7567 | | |
| Number | 4 | 5222 | 5774 | 6320 | 6864 | 7404 | | | |
| of | 5 | 5553 | 6115 | 6673 | 7228 | | | | |
| Slow | 6 | 5891 | 6467 | 7035 | | | | | |
| Movers | 7 | 6239 | 6826 | | | | | | |
| | 8 | 6600 | | | | | | | |
| | 9 | | | | | | | | |
| | 10 | | | | | | | | |
| | 11 | | | | | | | | |
| | 12 | | | | | | | | |
| | 13 | | | | | | | | |
| | 14 | | | | | | | | |

FIG. 27

METHOD FOR DETERMINING AND ELIMINATING THE DRIVERS OF NON-VALUE ADDED COST DUE TO PRODUCT COMPLEXITY AND PROCESS PARAMETERS

CROSS REFERENCE TO RELATED APPLICATION

This Application claims the priority of U.S. Provisional Patent Application Ser. No. 60/479,333, Filed: Jun. 18, 2003.

BACKGROUND

Organizations that provide services or manufactured products constantly face a fundamental precept of business, that is to reduce the costs of providing a highly desirable product or service in order to maintain a Return on Investment attractive to the owners.

These forces have caused companies to reduce internal costs using continuous improvement processes (e.g. Six Sigma, Lean, etc) to eliminate non-value added costs associated with quality and long lead times. Non-value added costs are defined as those costs that do not add a form, feature or function that the customer values. Examples include the cost of obsolescence, scrap and rework, excess capital investment, costs associated with transportation, stockrooms, warehousing, scheduling and supervision, and low direct labor productivity.

Businesses have also expanded the breadth of their product offering to grow revenue and respond to market demand. However, the costs associated with increasing complexity of products and services offered results in non-value added costs that have hitherto been difficult or impossible to estimate relative to other non-value added costs. Some of this complexity has resulted from the historical addition of products and services with no thought of standardizing subcomponents. Some of the cost of complexity is due to the propensity to add new products without a corresponding effort to eliminate products. The lack of symmetrical effort is in part due to a lack of knowledge of the cost of complexity. This has inhibited businesses from eliminating products that add cost but do not earn an adequate return on investment. This invention provides methods to make a quantitative determination of the costs of complexity, versus those due to quality, long setup time, downtime, etc. This will make it possible for business entities to make rational investments in complexity reduction along with other process improvement initiatives. The process of determining the cost of complexity applies to manufactured products as well as service items. Because manufactured products are tangible, such will be used for purposes of initial exposition and then generalized to service processes.

The cost of product complexity arises in two dimensions. Business entities that have designed products or services often, over time create unique components, part numbers or subassemblies for each end item offered to customers. As the number of end items grows, so do the number of unique components and the associated complexity costs. With suitable redesign, several offerings or end items can use common components or subassemblies, reducing the cost of internal complexity which is transparent to the customer. This is referred to as Non-value Add complexity. For example, the first named inventor herein was the CEO of International Power Machines. Over a period of five years, eight separate mechanical and electrical designs had grown to provide uninterruptible power supplies with ratings of 10, 20, 25, 37.5, 50, 60, 80, and 100 KW. By suitable redesign, more than 90% of all mechanical and electrical components and subassemblies were made common. This is an example of non-value added complexity, because the customer derived no benefit from the internal differences. In the present invention equations have been derived which compute the excess inventories, learning curve, and related costs that were eliminated by this process, resulting in an increase in gross profit margin from 15% to 37%. Each standardized rating adds about 20 unique part numbers. Standardization reduces the number of incoming supplies from fewer vendors, driving larger volumes through fewer items also resulting in lower cost. This process of standardization is depicted in FIG. 1.

In principle, it is possible to design a platform which will pre-standardize the components of the rollout of a new family of products. Standardization has the merit of making breakthrough cost reductions without eliminating any customer facing products or services. The process of producing any product or service can be analyzed as a process which links activities where work is done. Some of this work adds value as perceived by the customer. Many activities, such as moving material, operating stock rooms, warehouses, performing rework, re-learning work, etc., add no value. Many of these costs are due to complexity of the product.

A second cost of complexity dimension is value optimization and customer facing complexity. Standardization that simply eliminates non-value added complexity can be executed once the costs are known. However, products whose features and functions are desired by the customer, i.e., value added complexity, may not earn their cost of capital and should be considered for removal, out-sourcing, re-pricing, or process improvements which will eliminate the costs of complexity. But the true cost of carrying the complexity of low volume products may not be disclosed by traditional accounting. The true cost may be disclosed by activity based costing (e.g. Kaplan), but may logically lead to the elimination of products that do not earn their cost of capital. This invention provides prioritized process improvement methods for eliminating the cost of complexity and retaining a potentially valuable source of business owner return. Analysis in accordance with the invention will also determine if a product or service cannot be suitably improved, within the market price, leading to its elimination to optimize business owner value. By ordering the Stock Keeping Units (SKU) by decreasing Return On Invested Capital (ROIC), a curve similar to FIG. 2 has resulted.

A purpose of the invention is to enable a business entity to estimate the relative benefits of complexity reduction such that rational investments can be made versus other priorities.

Essentially any business process can be analyzed as a series of steps or activities which, in the aggregate, add significantly to the cost of producing the product or providing the service. Certain value added activities in business processes are, of course, essential to providing the product or service desired by the customer and are characterized as value added steps. These steps add a form, feature or function to the offering or product for which the customer would be willing to pay. However, certain non-valued added activities may contribute cost into the overall process as a result of process deficiencies or result from the complexity of the product or service itself. Process deficiencies such as the defects due to variation in quality will create non-value added activities of rework, or, if scrapped, will cause additional replacement products to be produced. In service environments, correcting an invoice, implementing an engineering change notice, etc. are examples of non-value added activities. In both cases, the non-value added activities act to slow down the velocity of the product or service. According to Little's Law, for a given level of demand, a slowdown in cycle time will increase the amount of Work In Process.

Other process deficiencies are directly responsible for slowing the velocity of the process. For example, if an activity has a long setup time to changeover from one customer requirement to another, it will cause the operator to "lock on" to customer requirements to minimize the wasted time in setup. However, this approach means that some customer requirement must wait a long time in queue, resulting again in large amounts of Work in Process, and creating major congestion and delay. This will cause excessive investment in Work in Process which creates non-value added costs of stockrooms, exacerbating the quality problems and, lost revenue. In service environments, this problem can often be mitigated by hiring additional labor to meet customer demands. Other time related process deficiencies include downtime or absenteeism, long process in time, poor work organization, queue time due to variation in demand, service, and supply rates, etc. Methodologies such as the Toyota Production System, Kanban, Lean, and Lean Six Sigma have been used to accelerate process velocity and eliminate non-value added cost and excessive work in process.

The two process deficiencies related to quality and speed have the result of increasing the number of value added activities in a process and effectively lengthening the chain from input to output. Experience shows that the majority of activities in unimproved processes are non-value added.

There is a third independent source of non-value add cost, slow velocity and large Work In Process (WIP) that is due to the complexity of the service or product offering itself. This source has been qualitatively understood and is the subject of many articles. What has not been understood is how to quantitatively measure the amount of non-value added cost due to product complexity versus the non-value added cost due to quality and speed deficiencies. While improvements in all three areas are important, their relative importance must be quantitatively understood to make rational investments in process improvement. The present invention provides an unambiguous method that allows this determination. FIG. 3 illustrates the relative power of Lean, Six Sigma and Complexity Reduction in reducing the amount of WIP.

SUMMARY OF THE INVENTION

The present invention provides a method for measuring the effect of product or service complexity on non-value added cost in processes for producing products and services, relative to the non-value added costs created by process deficiencies related to process speed or quality. The complexity of a product or service is the result of (a) too many products or services that are sold to customers which overlap or do not earn an adequate Return On Invested Capital and should be reduced through rationalization and (b) too many different modules or subassemblies which are used to create products or services that are sold to customers which can be reduced through standardization. In many business enterprises, this unnecessary complexity is the result of products or services being introduced over time with no attempt made to either rationalize or standardize the products.

In accordance with the present invention a method for measuring and reducing the cost of complexity in a product manufacturing process is provided which utilizes a continuous improvement process formula wherein Work In Process and finished goods in inventory are reduced by taking into consideration such factors as manufacturing setup time, the percentage of finished goods which are defective, the number of different parts, processing time per unit of product, workstation downtime, rework, variation in demand and supply rates and other variables which may be taken into account. Less well known is the fact that the cost of non-manufacturing service processes suffer from the same causal factors of setup time, variation in demand, etc., and hence are susceptible to the same form of analysis.

Other facets, advantages and superior features of the present invention will be appreciated by those skilled in the art upon reading the further description which follows in conjunction with the drawings.

BRIEF DESCRIPTION OF THE DRAWINGS

FIG. 8 is a diagram indicating a synchronized product schedule in accordance with the invention;

FIG. 13 is a diagram indicting a setup-on-batch-arrival production schedule;

FIG. 18 is a table indicating a moderately asynchronized production schedule;

FIG. 23 is a table showing a fully asynchronized production schedule;

FIG. 25 is a table showing a comparison of aggregate inventory levels for various schedules;

FIG. 26 is a table showing the total average Work In Process for a complex facility;

FIG. 27 is a continuation of the table of FIG. 26;

DETAILED DESCRIPTION OF A PREFERRED EMBODIMENT

Figure 1:
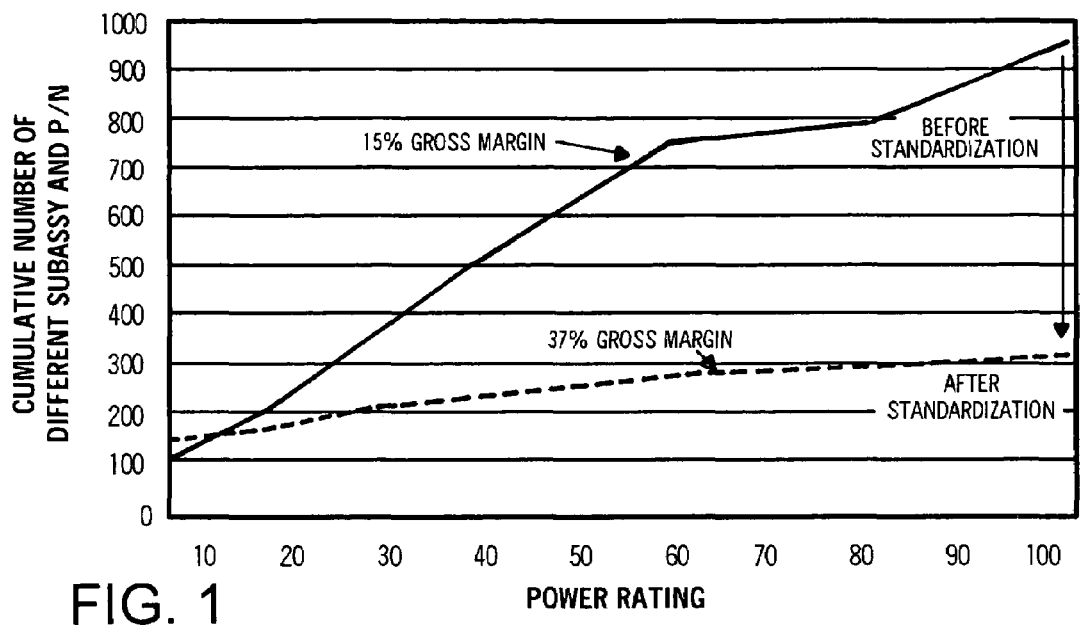
FIG. 1 is a diagram indicating the improvement in gross margin of a product line before and after standardization.
Figure 2:
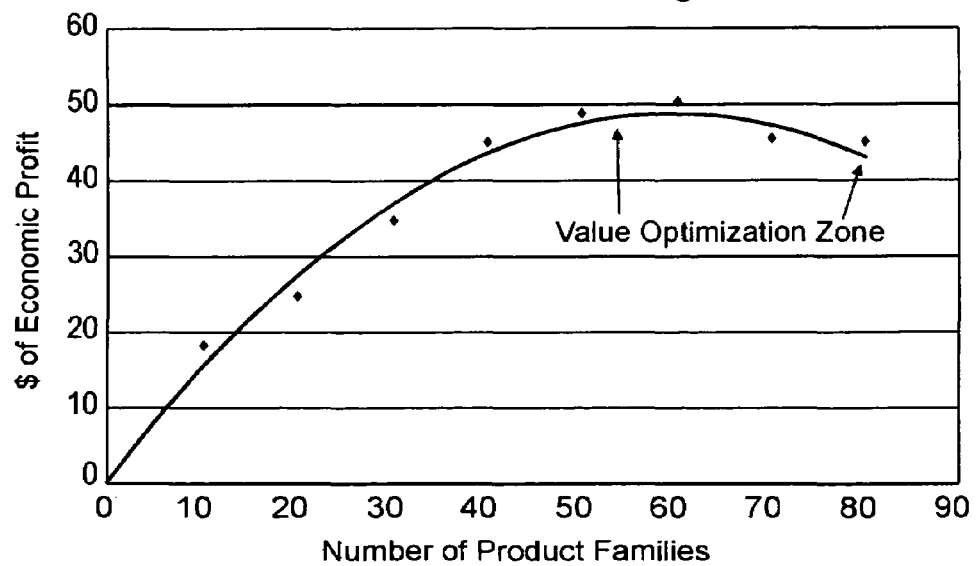
FIG. 2 is a diagram indicating the economic profit versus the number of products and showing the value optimization zone.
Figure 3:
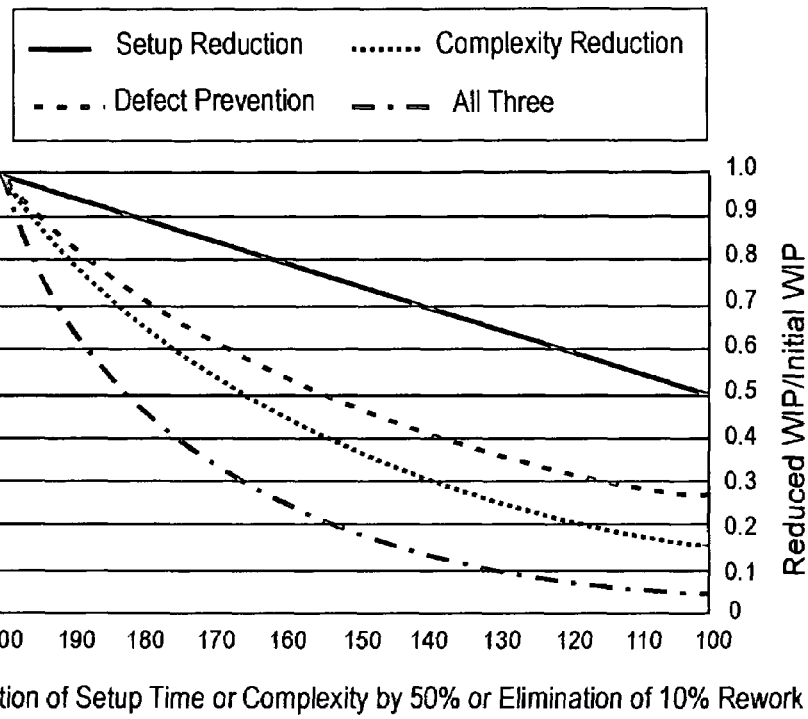
FIG. 3 is a diagram indicating the relationship between reduction of setup time or complexity as a function of the ratio of reduced Work In Process to initial Work In Process.
Figure 4:
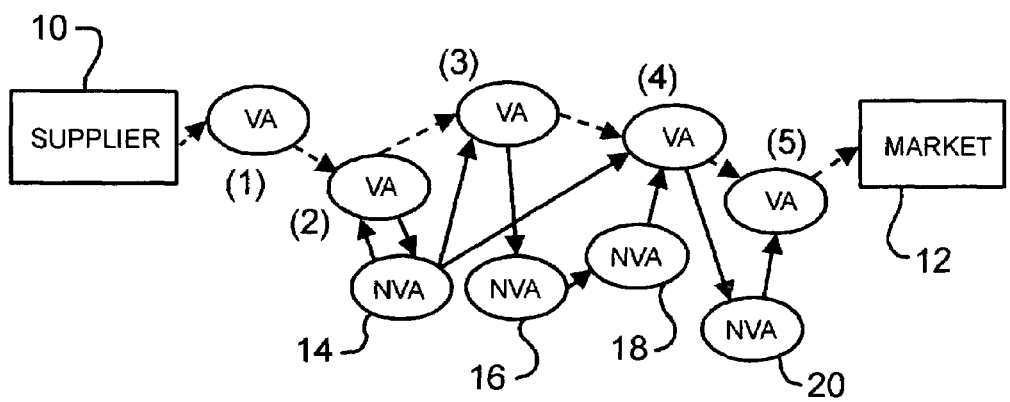
FIG. 4 is a process flow diagram illustrating the relationship and presence of value added and non value added steps.

Substantially all business processes can be represented as a series of steps or activities which are linked to provide a desired product or service. Referring to FIG. 4, for example, the manufacture of a product can be represented by a source of raw or partially furnished material which flows through a value stream until it emerges as a product ready for market. Workstations (1), (2), (3), (4) and (5) are interposed the source (supplier) 10 and the product ready for market 12. Value added steps are carried out at stations (1), (2), (3), (4) and (5), as indicated by the symbols "VA" at each station.

The ideal flow through the process of FIG. 4 is represented by the dashed lines. However, certain non-value added steps 14, 16, 18 and 20 may be interposed the value added steps at workstations (1), (2), (3), (4) and (5) as indicated in the diagram. These non-value add steps and their associated waste are in fact required to deliver goods and services at required completion rates despite the viscosity of the excess work in process. For example, material for work in process may require steps, such as placement of the material in stock rooms, movement to another workstation and/or testing. If a quality problem erupts, the amount of scrap and rework and, hence, the attendant non-value added activities will be directly proportional to the amount of Work In Process. In fact, the cost of non-value added steps is normally a major part of non-value add costs such as manufacturing overhead cost, and quality cost, which are typically two to three times the value added cost. A Complexity Value Stream Map (described below) segments each activity as value add, non-value add, or some mixture of both, and captures cost and process data. This mapping process often discloses that the number of non-value add activities in an unimproved process is significantly larger than the number of value add activities. The common metric that couples quality, speed and complexity and allows for the measurement of their relative impact on non-value add cost is their impact on the amount of Work In Process that they create. The relative value add reduction of process improvement versus complexity reduction can be determined analytically based on their relative reductions in Work In Process. It can be argued that a product that moved directly from value add to value add activity would have no non-value add cost. The first instance of this occurrence was approximated by the Highland Park, Mich. Model T automobile factory. One of the principal causes of this low cost production was the boundary condition that only one product would be produced, eliminating all variety and, hence, complexity, setup time, etc.

Figure 5:
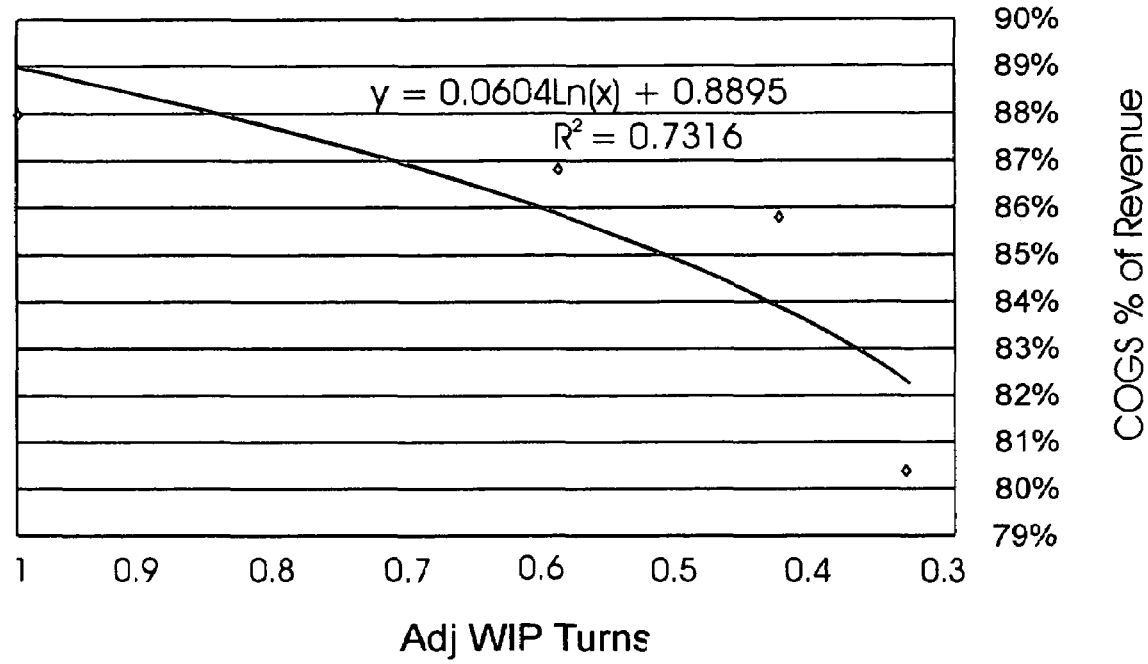
FIG. 5 is a diagram indicating the cost of goods sold versus adjusted Work In Process turns.

Empirically, a Tier 2 supplier of automotive coupled hoses was able to improve inventory turns (measured as Cost of Goods Sold (COGs/WIP) from 23 to 66 using a combination of process improvements and complexity reduction (internal part numbers were reduced by 35%). The result was that manufacturing overhead cost fell by 21%, or $6.0 m out of a total of $28.6 m. The relationship between WIP and cost is a fluctuating function as shown in FIG. 5.

It should be noted that Complexity Value Stream Mapping estimates the beginning and ending non-value add cost. The curve between is subject to all the exigencies of the improvement process and a single analytic curve is thus not to be expected.

The increasing slope of cost reduction is due to the quantized nature of many costs such as off site warehouses, plant consolidations, outsourcing of non-core competencies, etc. which can only take place when the flow of work is essentially from one value add activity to another. This only occurs as cycle efficiencies (discussed below) exceed 20% which relates to reduction of Work In Process of 60–90%.

It also explains why a company, such as Toyota Corporation, strives for WIP turns and cycle times that are faster than required by the market by the application of Lean, Six Sigma tools. To make the analysis revenue neutral, divide the WIP turns at any given moment by the WIP turns at the beginning of the improvement process, i.e., time "t"=0:

$$WIP \text{ Turns Improvement} = \frac{\left(\frac{\text{Cost of Goods Sold}_0}{\text{Work In Process}_0}\right)}{\left(\frac{\text{Cost of Goods Sold}}{\text{Work In Process}}\right)}$$

$$= \left(\frac{(W)(COGS_0)}{(W_0)(COGS)}\right)$$

Figure 6:
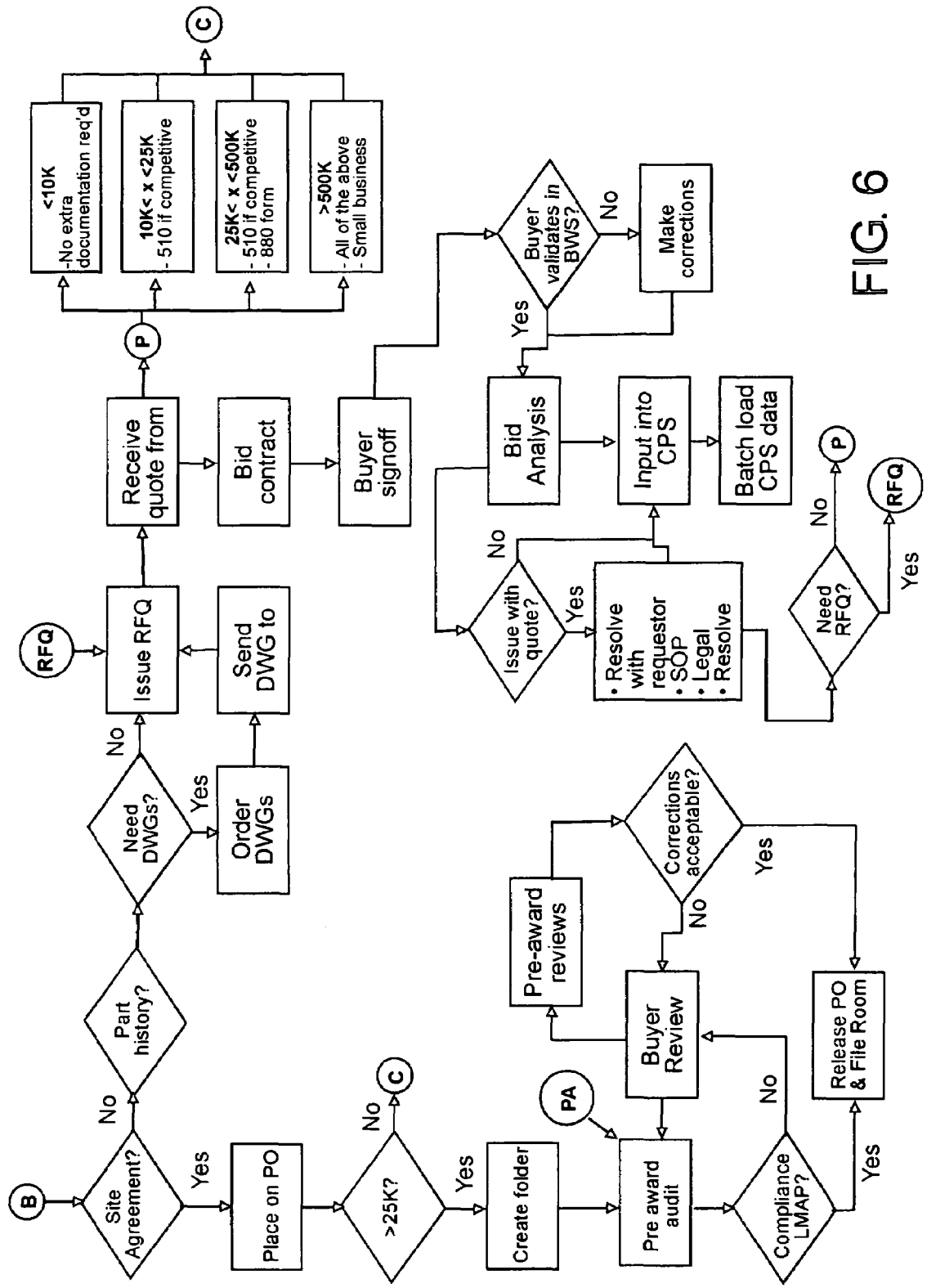
FIG. 6 is an illustration of a typical value stream map.

A Complexity Reduction Value Stream Map (CVSM) begins by using colors or other techniques to visually separate value-added from non-value-added work on a process map. An example of a CVSM is shown in FIG. 6. Through a series of analyses, additional data summarized below can be added.

A cross functional team collects data in a CVSM which indicates where the waste is and provides the data needed to eliminate the waste, improve quality and speed. The data will be collected separately at each activity within a process. The average and the standard deviation of all data may be collected.

Classification of activities as (a) value add, (b) non-value add, (c) required non-value add, (d) process time (P/T) (Value add time per unit for each type of service or product), and (e) time between changing from one service or product to another should be carried out. Data should be collected on all activities in which item (d) is greater than item (e). Still further activities to be classified are (f) changeover or setup time (time to switch between tasks), (g) queue time (the time "things" spend waiting to be processed), (h) take time (the demand rate of customers for each type of service or product), (i) complexity (number of different services or products processed at the activity), (j) uptime (time worked per day less breaks and interruptions), and (k) defects and rework percent per service or product at each activity with time and cost.

From this activity level, data regarding current and future process performance can be computed including process cycle efficiency, lead time and variation, prioritized time traps, cost reduction and revenue growth opportunity.

The starting value of non-value add cost, and the ending residual non-value add cost are estimated from the mapping process. The Complexity Value Stream Map parses activities between value add and non-value add and is business enterprise specific. Some portions of non-value add cost, such as supervision, planning, depreciation and amortization, and stockroom costs may be reduced, but not eliminated whereas non-value add activities such as rework, scrap, setup etc may be eliminated to a greater degree. The result is that some of the non-value add costs are irreducible as a function of WIP. The amount of non-value add may be computed from a CVSM. If one is able to compute this impact on Work In Process separately, rational investments can be made in Six Sigma, Lean, and product value optimization and standardization efforts.

This invention also provides a method for computing and prioritizing the process drivers of Work In Process, among which are product complexity, quality problems, setup time, etc. By prioritizing these drivers of WIP, costs defined in a CVSM can be eliminated. The amount of WIP cannot be reduced by management fiat. Rather, specific process improvements are required. An example is that of a large press having a long setup time. To maintain productivity, each product will be produced in large batches prior to another setup. This necessarily creates large amounts of Work In Process. Editing low Work In Process would result in producing in batch size of one with catastrophic results to cost. Rather than management fiat, the process improvement known as the Four Step Rapid Setup method must be applied (e.g. Shingo). This invention derives a method for computing the intrinsic or minimum Work In Process that is currently required to meet existing demand, and use this output to prioritize reductions in product complexity, setup time, downtime, quality problems etc.

The model contained herein describes a general batch-flow manufacturing or service/transactional environment in which batches of distinct parts or work products are processed in serial fashion through distinct workstations or activities. Using the analysis of prior U.S. Pat. Nos. 5,195,041 and 5,351,195, which are incorporated herein by reference, and extending the analysis to the complexity of the product line, the minimum batch size consistent with meeting customer demand without delay or stockout, and the workstation turnover time implied by that batch-size regimen, may be derived. The analysis is then extended to derive formulas for the average aggregate (i.e., across parts/products) Work in Process Inventory and the average aggregate Finished Goods Inventory that result from this processing strategy. While the derivation is performed in a manufacturing context, it will be shown to apply to any process.

The equations of the present invention can be used for the following purposes:

1. To determine the size and location of Work In Process inventories in the process.
2. To determine the effects of set-up times, downtimes, poor quality, and part (product) complexity on the average aggregate inventories in the facility. This permits the user to focus efforts on, for example, setup time reduction, quality improvement, and part/product simplification at those points in the process in which the reduction in inventories will be maximized. It also allows the user to predict the magnitude of inventory reduction that will be achieved by a specified setup-time reduction, downtime prevention, quality improvement, or part/product complexity reduction, thus permitting the user to set priorities in improvement efforts.
3. To reduce the overhead cost, quality cost, and lost revenue that are related to large amounts of Work In Process and the resulting slow cycle times.
4. To construct a computer software application that permits these equations to be used in a plant of arbitrary size (i.e., number of workstations) and arbitrary complexity (i.e., number of distinct parts/products).

A product manufacturing example is a suitable example because the resulting work in process inventory can be physically observed and traced through the process. The conclusions apply with equal force to service process applications such as procurement, marketing, and product development, whose "Work In Process" now generally exists as electronic files moving through a network of computer work stations and storage media.

Figure 7:
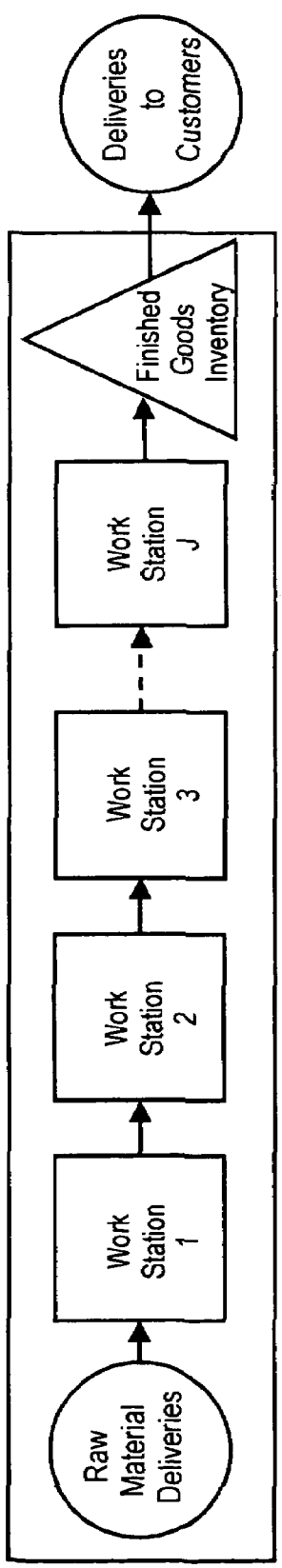
FIG. 7 is a diagram showing a typical workflow from raw material deliveries to deliveries of finished goods to a customer.
Figure 9:
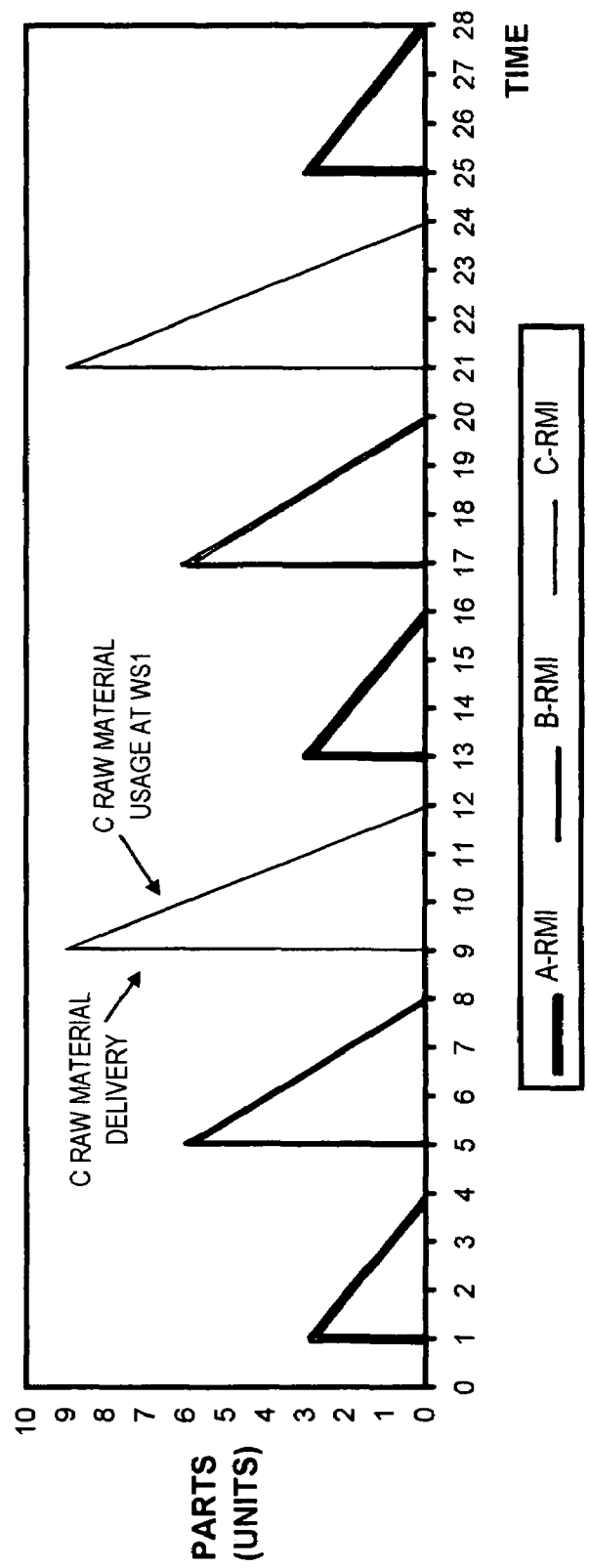
FIG. 9 is a diagram illustrating raw material inventory in front of a first workstation with synchronized production.
Figure 10:
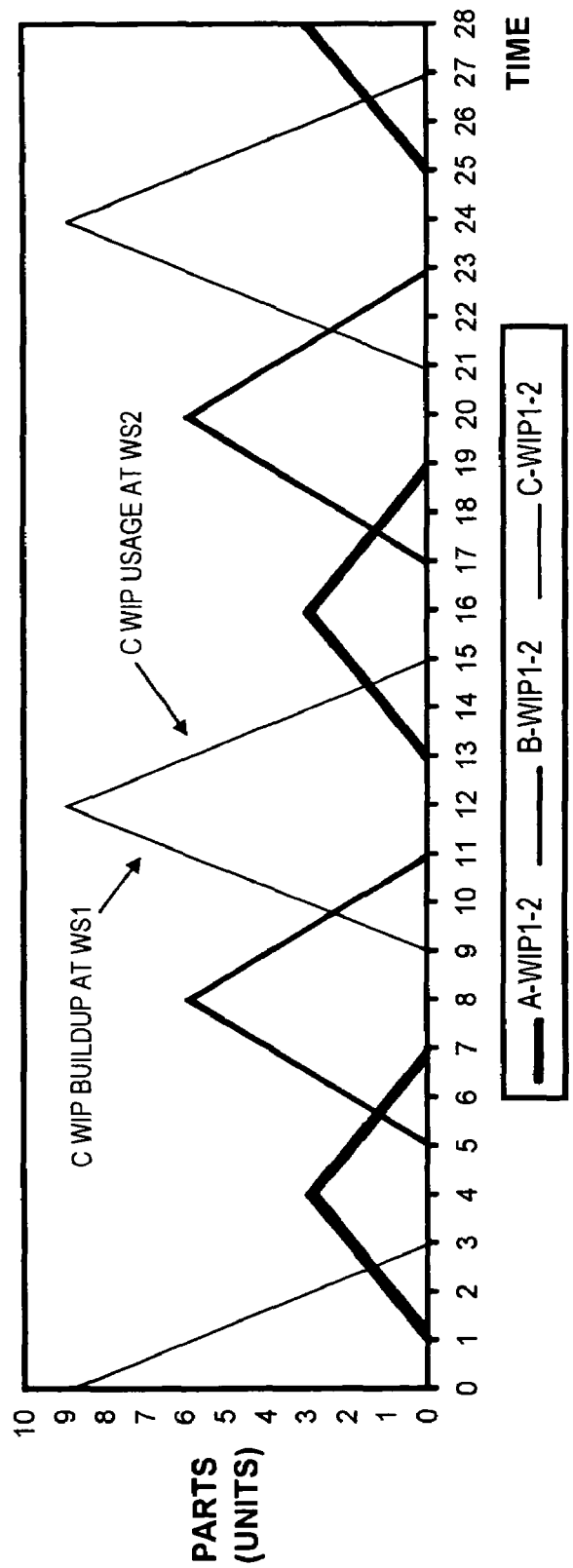
FIG. 10 is a diagram indicating Work In Process inventory between first and second workstations with synchronized production.
Figure 11:
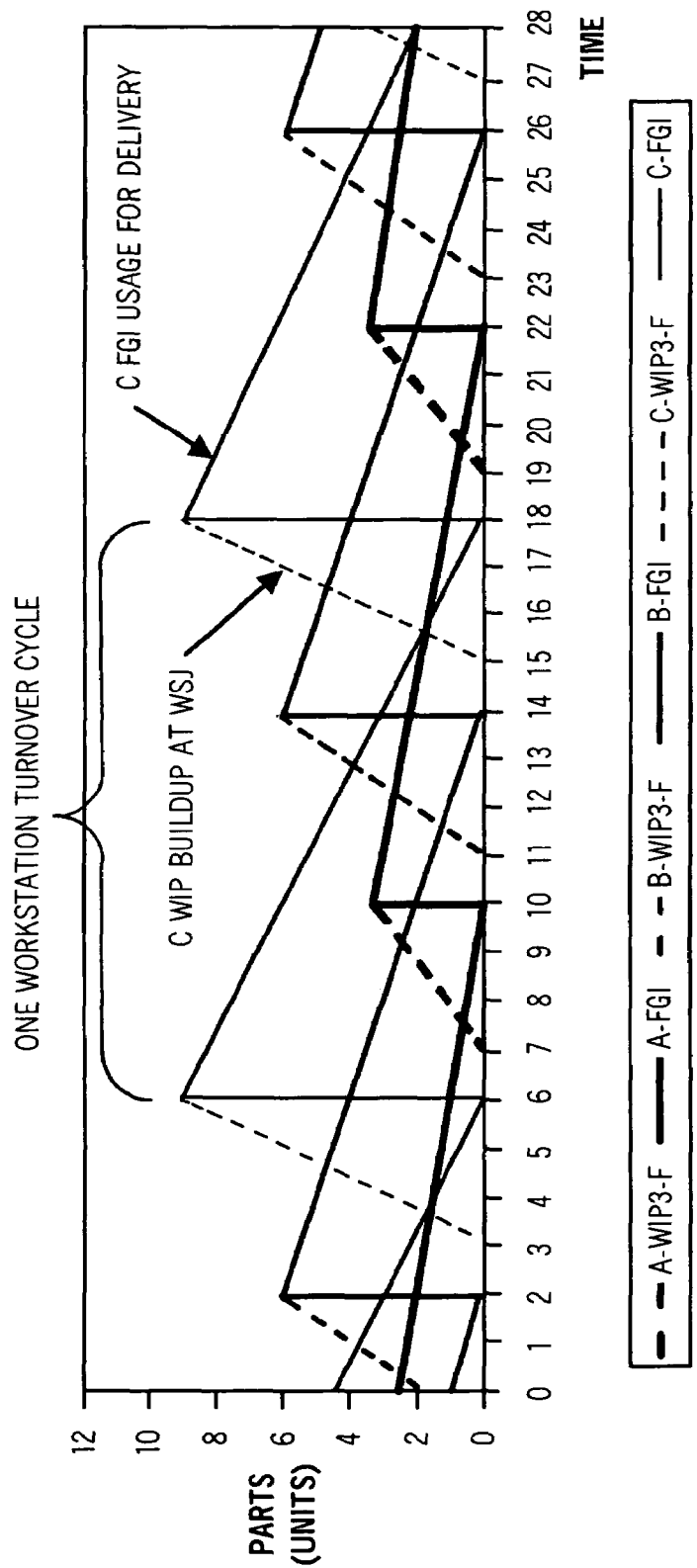
FIG. 11 is a diagram indicating finished goods in inventory with synchronized production.

Consider a manufacturing facility that processes parts and subassemblies in batches through a series of sequential workstations, as shown in FIG. 7. For ease of specification, the same processing route may be provided for all parts and subassemblies. In accord with predominant manufacturing practice, the flow may be modeled as possessing the following characteristics:

1.) Raw materials and/or purchased parts are delivered to the upstream terminus of the process in batch quantities of the same size as the processing batches required at a first workstation.
2.) Batches remain integral throughout the process. This characterization implies two separable features. First, batches are not re-sized to accommodate different processing rates and/or setup times at each workstation. Second, as parts complete their processing at an upstream workstation, they are transported to the next workstation in transfer batches of the same size as the processing batch.
3.) Parts are transported from the final workstation (J) to a finished goods inventory storage location, to await delivery to customers. Parts/products are transported in transfer batches of size equal to the processing batch at final workstation J, FIG. 7. However, customers are not constrained to accept delivery in batches or in production sequence. One can model the demand for finished goods as simultaneous, parallel flows for all parts/products, each with a characteristic demand rate expressed in units of product per unit time.

For example:

$$\Lambda = \sum_{i=1}^{N} \lambda_i \quad (1)$$

where:
i=part/product index, i=1, . . . , N. That is, the facility produces N different parts or products.
$\lambda_i$=customer demand rate for part/product i, expressed in units per hour. Thus, $\lambda_i$ is an element in an N-dimensional vector of demand rates.
$\Lambda$=aggregate customer demand for all parts/products produced in the facility.

Certain ones of the parameters identified below are used in further equations which follow herein:

$S_{ij}$=the setup time required to prepare workstation j to produce a batch of part/product i. Thus, $S_{ij}$ is an element of an N×J matrix of setup times.
$P_{ij}$=the time required to process one unit of part/product i at workstations. Thus, $P_{ij}$ is an element of an N×J matrix of processing times.
$B_{ij}$=the batch size in which part/product i is processed at workstation j. Thus, $B_{ij}$ is an element of an N×J matrix of possible batch sizes.
j=workstation index, j=1, . . . , J. That is, the processing route consists of J distinct workstations.

Using the logic and equations developed in the methods described in U.S. Pat. Nos. 5,195,041 and 5,351,195, one can derive the minimum batch size that can be processed at each workstation that is consistent with meeting the vector of demand rates without stockout or delay. This minimum batch size may be denoted by $MINB_{ij}$. In other words:

$MINB_{ij}$=minimum batch size allowable for processing part/product i at workstation j, which fulfills demand rate $\lambda_i$.

Processing of the minimum batch sizes $MINB_{ij}$ at workstation j implies a workstation turnover time (WTT) for that station, i.e., the time interval required to complete one production cycle through all N products. This time interval may be denoted by $WTT_j$, wherein:

$WTT_j$=workstation turnover time at workstation j, within which the workstation can be setup for, and complete processing of one batch of size $MINB_{ij}$ for all N parts/products produced by the facility.

The algorithm described in U.S. Pat. Nos. 5,195,041 and 5,351,195 provides a method to compute $MINB_{ij}$ and $WTT_j$ for each product i and each workstation j. That is, the algorithm and an associated computer program may compute the minimum batch size consistent with meeting final customer demand without stocking out of any part or product, as well as the workstation turnover time associated with the minimum batch sizes. However, this procedure does not compute the implied work in process and finished goods inventory levels implied by this strategy. That extension is the focus of the methods described herein. Given the description of the processing system provided, and utilizing the minimum batch size computations, it is possible to derive the Work In Process and finished goods inventory profiles.

The amounts of Work In Process and finished goods inventories are determined both by the physical parameters of the process (e.g., processing times and setup times) and by management policies, such as the production schedule. In the derivations that follow, the inventory levels may be derived that are induced by (a) using the minimum batch sizes consistent with meeting customer demands, and (b) considering a range of production schedules that vary from perfectly synchronized production to fully asynchronized production; these terms are defined below.

Perfectly Synchronized Production

To illustrate the inventory profiles, consider the following production schedule. In the table of FIG. 8, the first two columns are the time index, and the three further columns depict the status of three serial workstations. The label SA indicates that the workstation is being setup to process part A, and the label PA indicates that the workstation is processing a batch of part A. Identifiers SB, PB, SC and PC indicate the corresponding activities for parts B and C, respectively. One complete workstation turnover cycle includes setting up for part A, processing a batch of part A, setting up for part B, processing a batch of part B, setting up for part C, and processing a batch of part C.

This schedule exhibits perfectly synchronized production. While this condition is ideal, and seldom if ever realized, it provides a transparent derivation needed for the asynchronous processes which are observed in practice. That is, the batch release timing has been coordinated so that, for example, Workstation 2 of FIG. 7 has been setup to accept a completed batch of part A from Workstation 1 just as Workstation 1 completes that batch of part A. This same "smooth handoff" occurs for all products at all workstations.

Similarly, raw material deliveries occur in perfect just-in-time fashion, i.e., immediately following the setup procedures required to prepare Workstation 1 to process the part in question.

In general, setting the minimum batch size of all stations to that implied by the most constrained workstation will facilitate this smooth flow, although we should emphasize that perfect synchronization cannot be guaranteed in all situations. It is possible to construct examples in which the particular sequences of setup times and processing times do not permit perfect synchronization without occurrences of starvation or blocking between at least one pair of consecutive workstations, hence emphasizing the need for a detailed computational program. However, the combination of minimum batch sizes with a perfectly synchronized schedule minimizes work in process inventories, thus providing a benchmark for comparative purposes.

This simplified scenario can be continued to depict the inventory buildup and usage profiles at typical workstations in the facility. To ease interpretation of FIGS. 9 through 12, the timing labels shown in FIG. 8 have been maintained and the minimum batch sizes of parts B and C have been set to be twice and three times that of part A, respectively.

Consider the first (i.e., furthest upstream) workstation in the routing, labeled WS1. Raw materials or purchased parts are delivered to WS1 just as they are needed to begin processing, i.e., just as the appropriate setup operation has been completed. These raw materials are converted to Work In Process (WIP) at WS1, hence the buildup of WIP as raw material inventory declines. The now partially processed WIP is transferred to Workstation 2, and the pattern of incoming WIP decline and outgoing WIP buildup continues, as the batches flow downstream through the series of workstations. This policy yields the inventory profiles shown in FIGS. 9 and 10.

After passing through the first J-1 workstations, the batches enter the final workstation before finished goods inventory. The inventory profile changes here, because a batch size sufficient to meet all customer demand throughout the workstation turnover time interval must be processed. This batch is processed at workstation J, and enters finished goods inventory, from which it is depleted as deliveries are made to customers at rate $\lambda_i$ for each of the N products. These deliveries are made in parallel (i.e., simultaneously) for all products. This policy leads to the inventory profile shown in FIG. 11.

Figure 12:
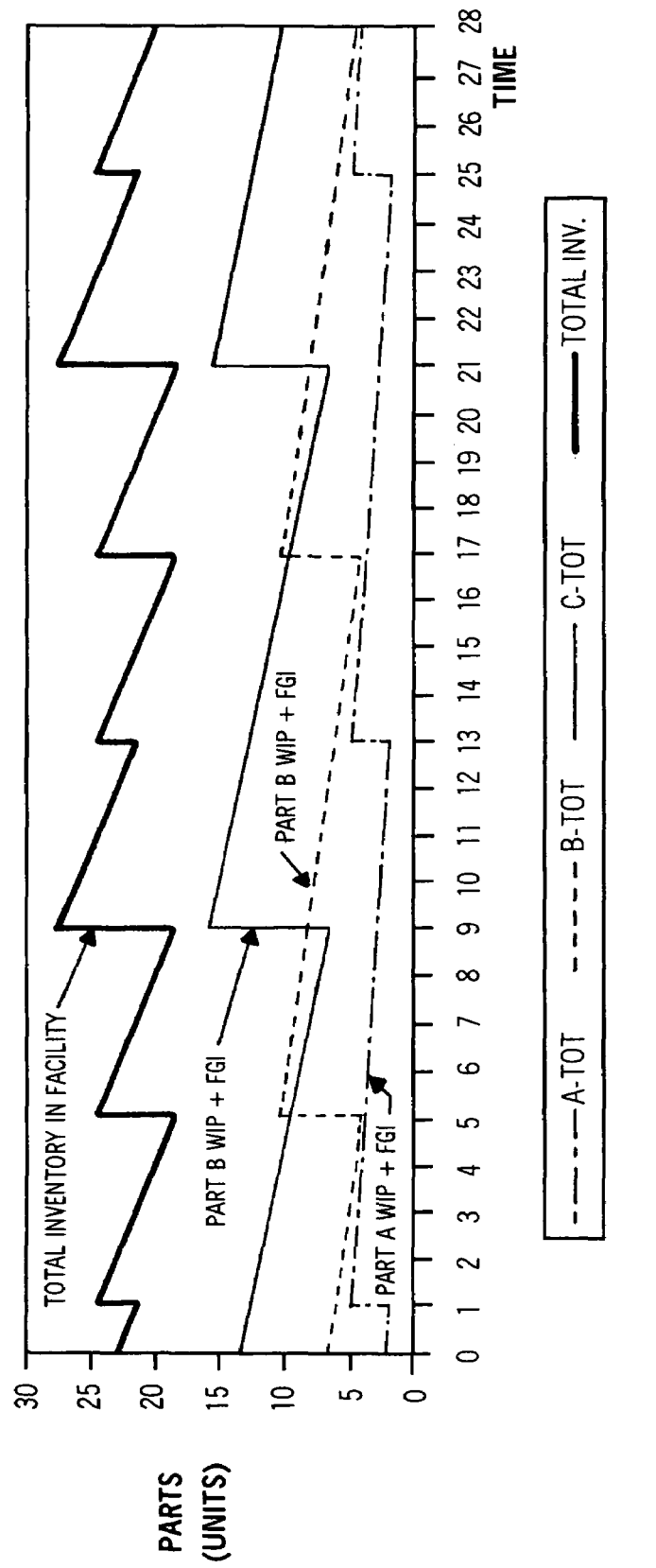
FIG. 12 is a diagram indicating aggregate inventory levels with synchronized production.

The algorithms described herein can be used to compute the inventory levels at the various workstations in the facility, and to aggregate those values to compute the aggregate inventory levels maintained in the facility. FIG. 12 shows aggregate inventory levels for a simplified production example of synchronized production.

Real factories that have been set up with "synchronous manufacturing" in mind have in fact minimized work in process inventories and have done so at the expense of large finished goods inventory. In attempts to apply "synchronous manufacturing" using a variant, without improving setup time, etc. it has been observed that automotive engine factories in which the whole factory was setup to machine and assemble engine type A that Work In Process flows from index machining to assembly and test was carried out with minimum Work In Process. In one case, four engine types were produced, with three days spent per engine type. The Cycle Time Interval between repetitions was twelve days. Assuming demand exactly matches supply, an average of at least six days of inventory exists in finished goods. Thus the non-value add cost has in part been exported to the cost of a warehouse.

As noted above, the perfectly synchronized production schedule represents an ideal case that may not be attainable, even in theory, for a given set of production parameters (setup times and processing times). The "next best" scenario is shown in the table of FIG. 13. In this schedule, the setup procedures for part A at Workstation 2 (WS2) begin when the batch of part A arrives at Workstation 2 for processing, and similarly at all workstations, including Workstation 1 (WS1). The schedule actually assumes that setup for Part A at Workstation 2 begins as the batch of part A is completed at Workstation 1, acknowledging that the physical transport of the batch between stations can constitute part of the setup of the downstream station.

Figure 14:
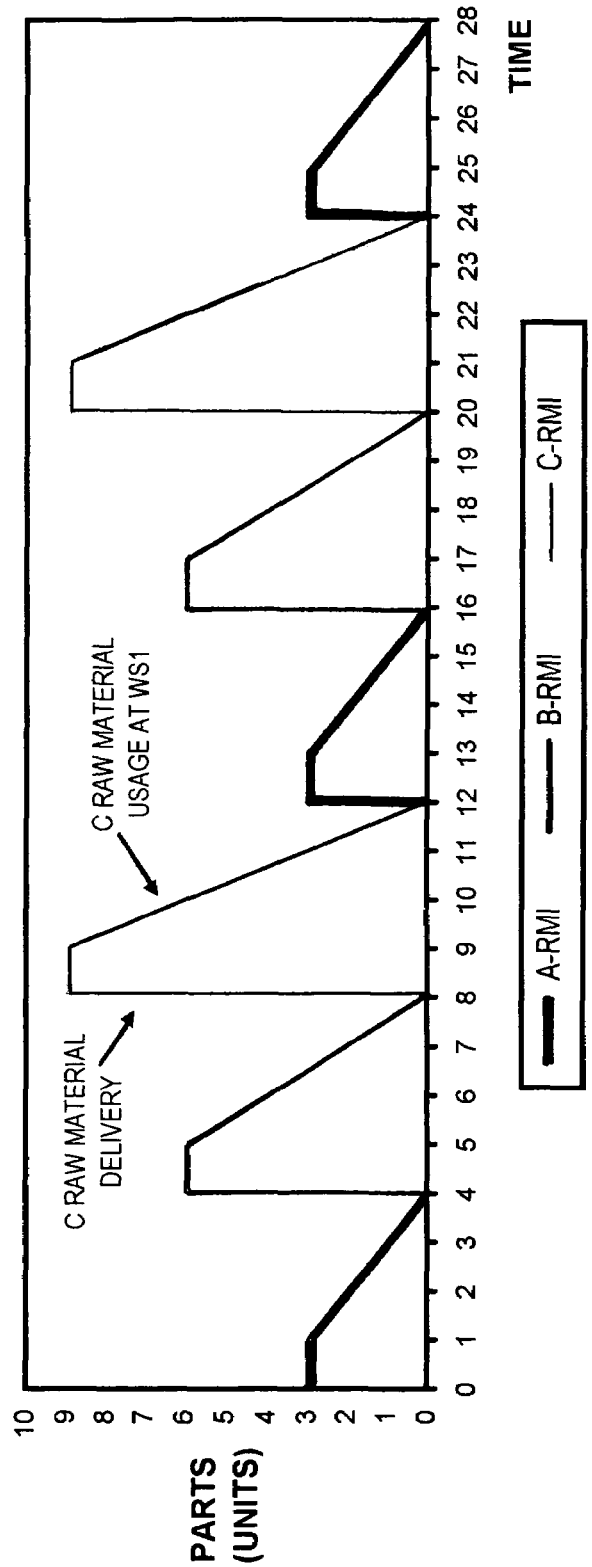
FIG. 14 is a diagram indicating raw material inventory in front of the first workstation with a setup-on-batch-arrival schedule.
Figure 15:
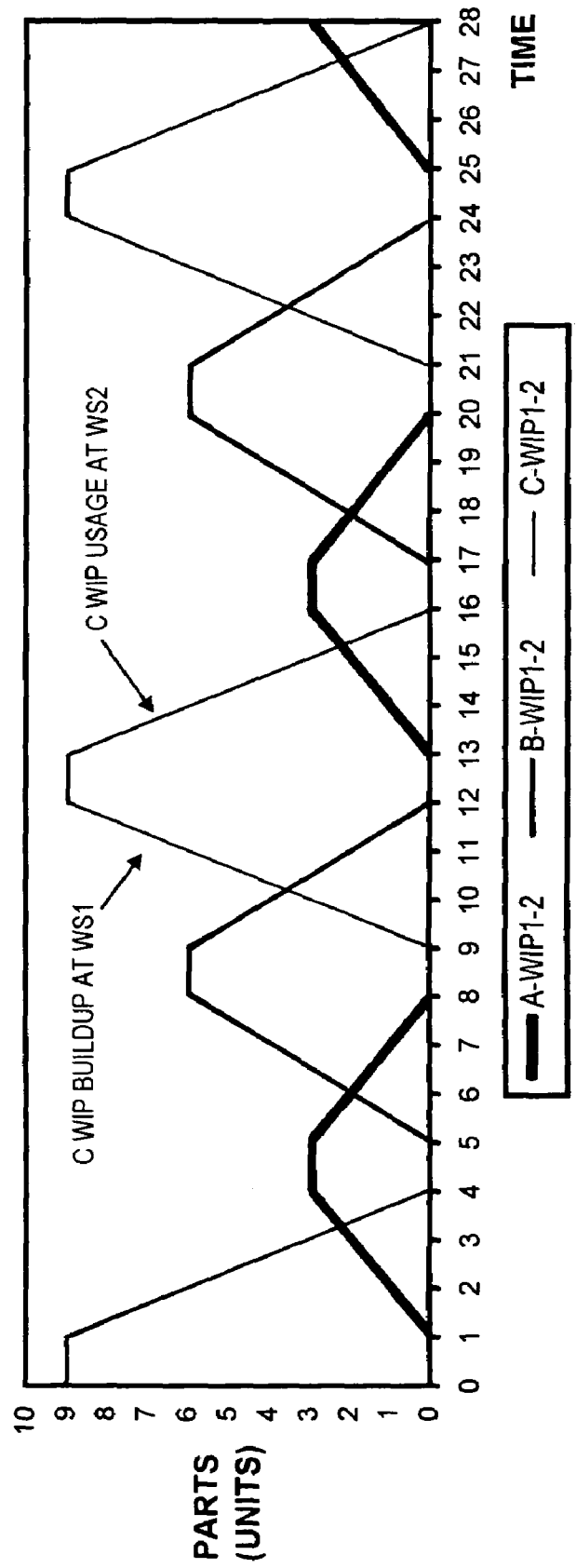
FIG. 15 is a diagram indicating Work In Process inventory between workstations with a set-up-on-batch-arrival schedule.
Figure 16:
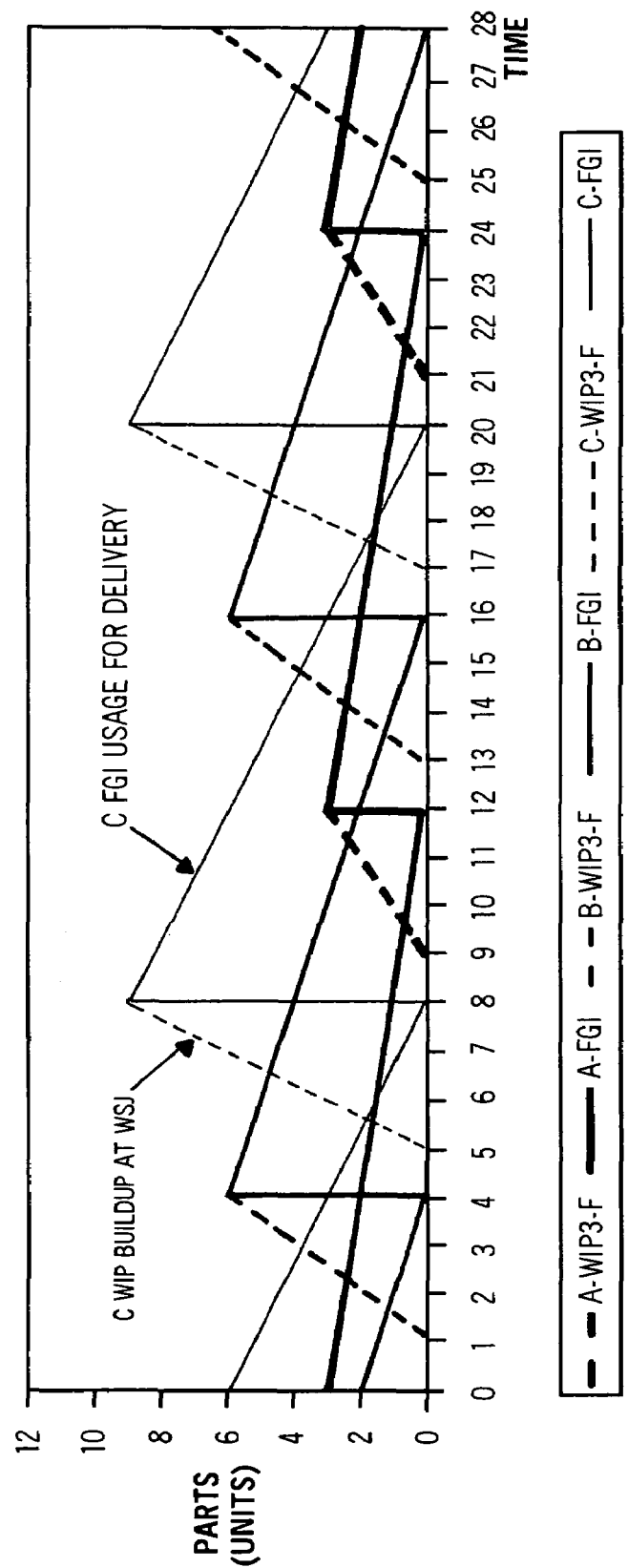
FIG. 16 is a diagram indicating finished goods inventory with a setup-on-batch-arrival schedule.

The setup-on-batch-arrival scheduling policy increases the amount of Work In Process and raw material inventories in the facility, as shown in FIGS. 14 and 15. The amount of finished goods inventory is unaffected, although its timing is shifted, as shown in FIG. 16.

FIGS. 14 and 15 indicate that the raw material and Work In Process inventory profiles are trapezoids rather than triangles. That is, batches do experience periods of waiting in which no units in the batch are being processed. Still, this schedule is highly synchronized, and the amount of waiting is minimal. Although somewhat less likely, it also is still possible to construct a hypothetical set of products, setup times, and processing times for which no setup-on-batch-arrival schedule can be constructed without occurrences of starvation or blocking between at least one pair of consecutive workstations.

Figure 17:
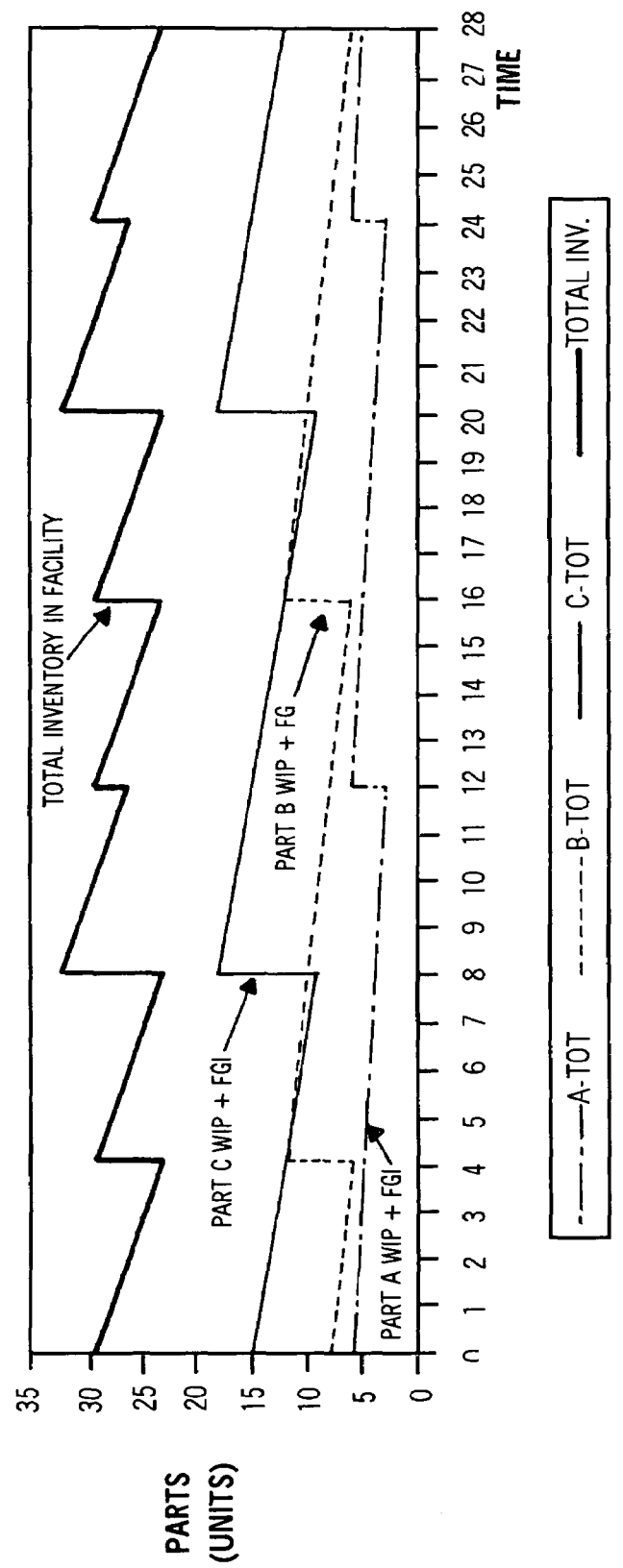
FIG. 17 is a diagram indicating aggregate inventory levels with a setup-on-batch-arrival schedule.

The profile of total inventory in the facility is shown in FIG. 17. The shape of the profile is identical to that of FIG. 12 (i.e., for perfect synchronization), but the absolute levels are increased. That is, the level of total facility inventory varies between 18.5 and 27.5 units under a perfectly synchronized schedule, but the Setup-On-Batch-Arrival Schedule yields a total inventory level that varies between 23 and 32 units.

Moderately Asynchronized Production

To depict a schedule that departs even further from the perfectly synchronized example above, and represents a real process, consider the schedule shown in FIG. 18. In this schedule, the various batches are out of perfect synchronization by one part/product. That is, when a batch of part A arrives at Workstation 2, it must wait for a batch of part C to be setup and processed before it can be setup and processed. While clearly sub-optimal from an inventory minimization perspective, this schedule might be viewed as the upper limit of observed best practice in a manufacturing or transaction processing environment.

Figure 19:
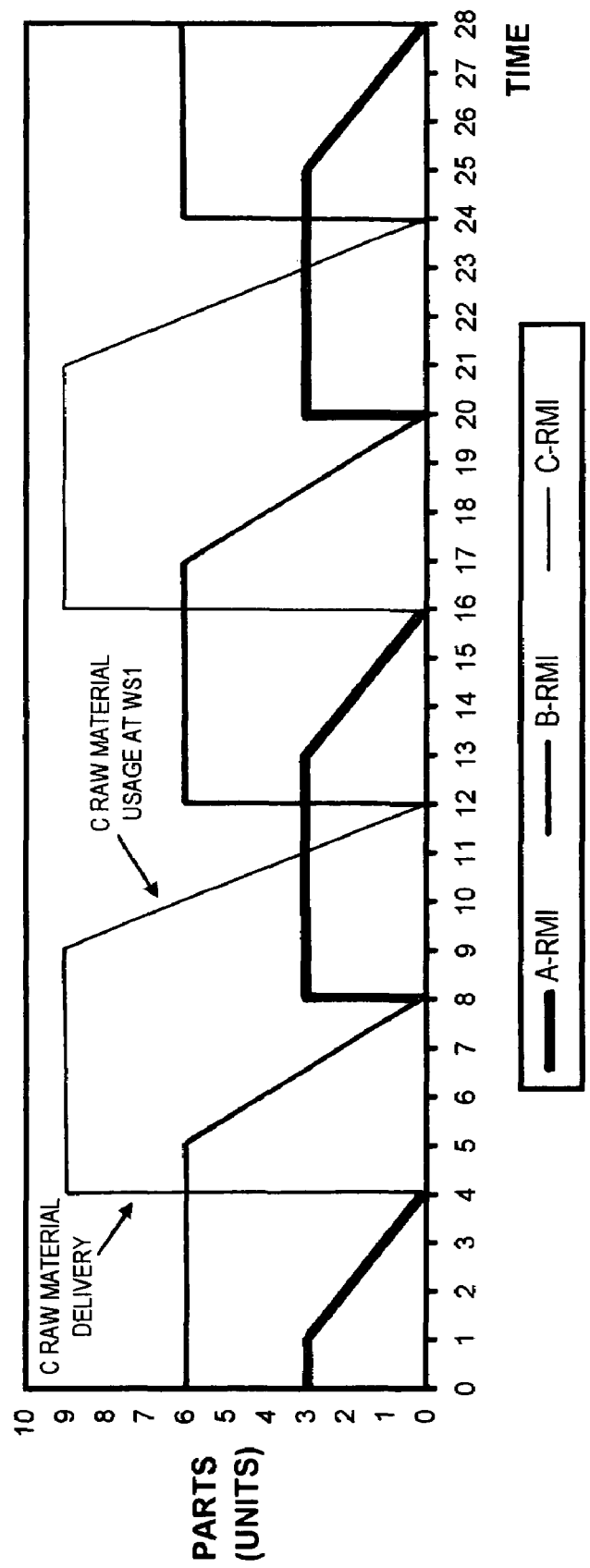
FIG. 19 is a diagram showing raw material inventory in front of a first workstation for a moderately asynchronized production schedule.
Figure 20:
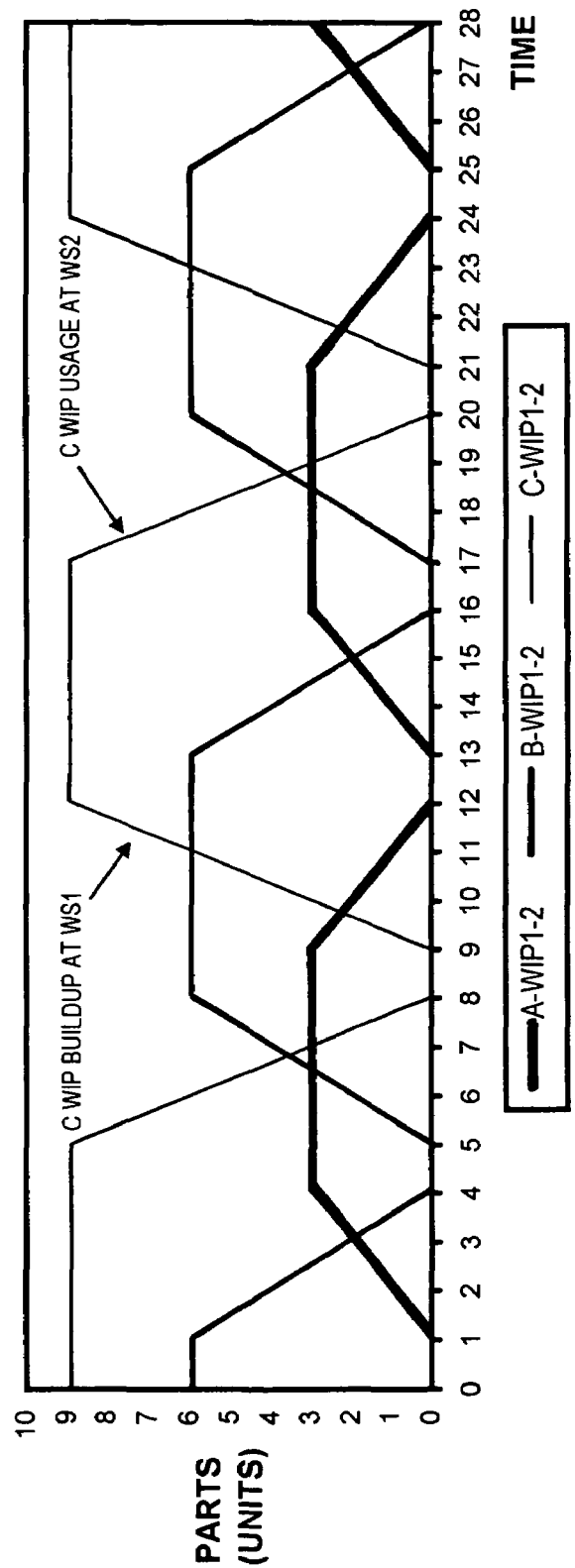
FIG. 20 is a diagram indicating Work In Process inventory between first and second workstations for a moderately asynchronized production schedule.
Figure 21:
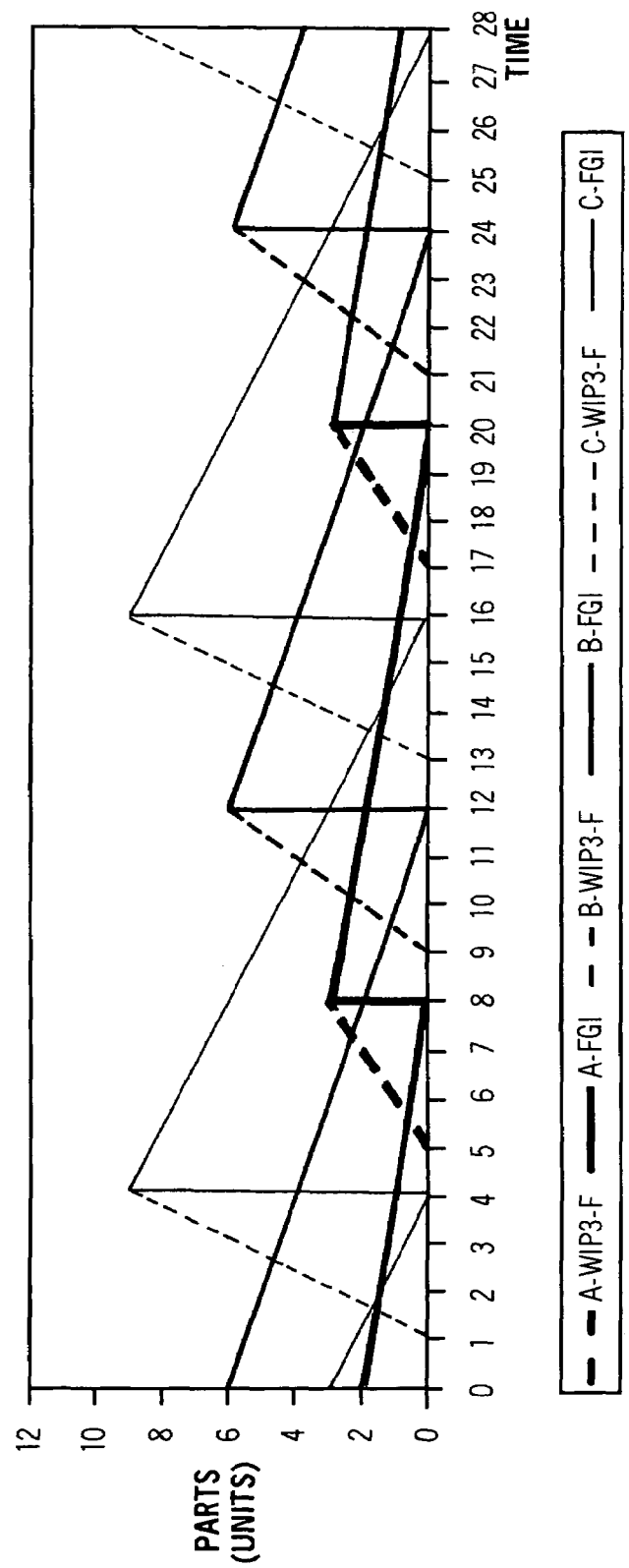
FIG. 21 is a diagram indicating finished goods inventory for a moderately asynchronized production schedule.

The raw material and work in process inventory profiles in FIGS. 19 and 20 continue to be trapezoidal in shape, but now the waiting periods between processing steps have grown, as indicated by the extended bases of the trapezoids. Inventory management itself now becomes more complex. Consider the time interval from hour 6 to hour 7 in FIG. 20. During this period, batches of all three products are present between Workstations 1 and 2; a batch of part C still is being processed at Workstation 2, a batch of part A is awaiting processing at Workstation 2, and a batch of part B is building up at the downstream port of Workstation 1.

Figure 22:
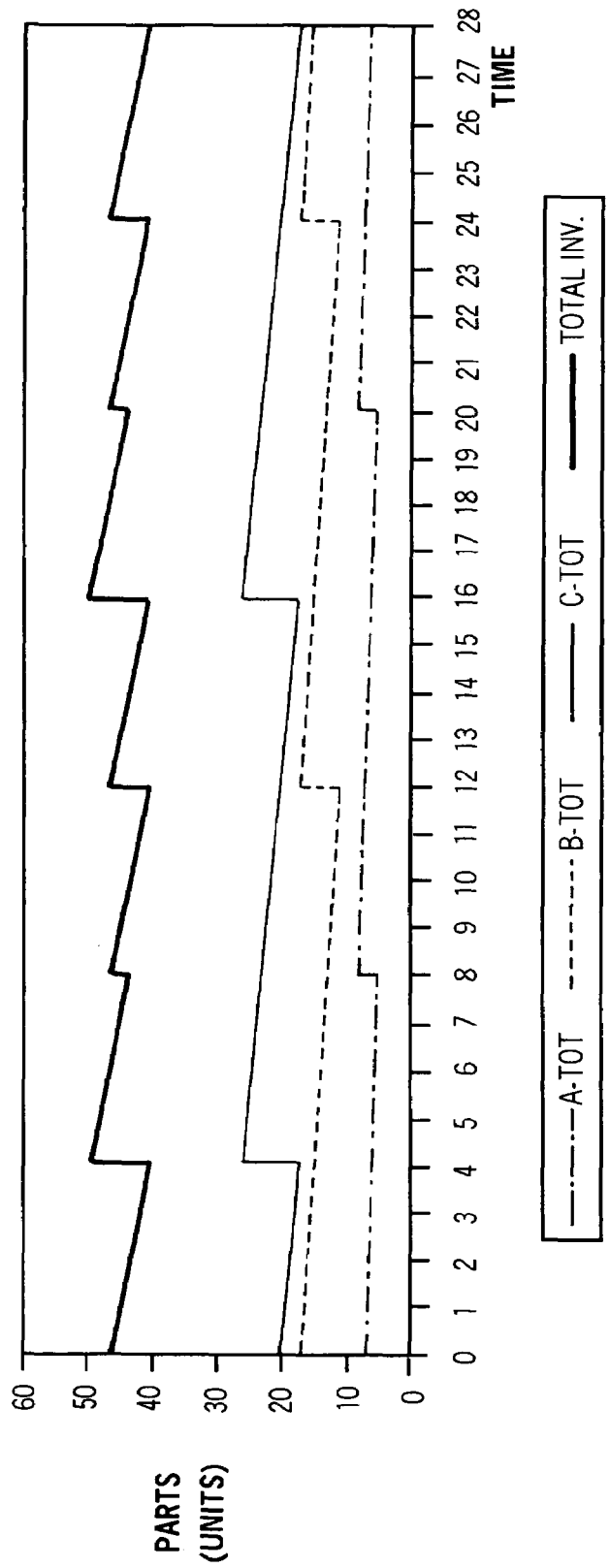
FIG. 22 is a diagram showing aggregate inventory levels for a moderately asynchronized production schedule.

The profile of total inventory in the facility is shown in FIG. 22. Again, the shape of the profile is identical to those shown in FIGS. 12 and 17, but the absolute levels have increased further, now varying between 41 and 50 units.

As the figures associated with the preceding two forms of production suggest, raw material and Work In Process inventories continue to grow as the production schedule departs further from the ideal of perfect synchronization. To provide a theoretical benchmark at the other end of the spectrum, consider the schedule shown in FIG. 23. Under this scheduling regime, all workstations are performing the setup associated with product A at the same time; similarly for products B and C. Thus, when a batch of product A arrives for processing at Workstation 2, it finds itself last in line behind one batch of every other product. If one were to allow the schedule to deteriorate further, a watchful scheduler would notice that each upstream workstation could be shut down for an entire workstation turnover cycle, to allow one set of batches of all products to "flush through" the system, to reduce inventory levels without degrading delivery service to customers. Thus, this schedule suggests the maximum level of inventory that would be encountered before alternative corrective actions would be anticipated.

Figure 24:
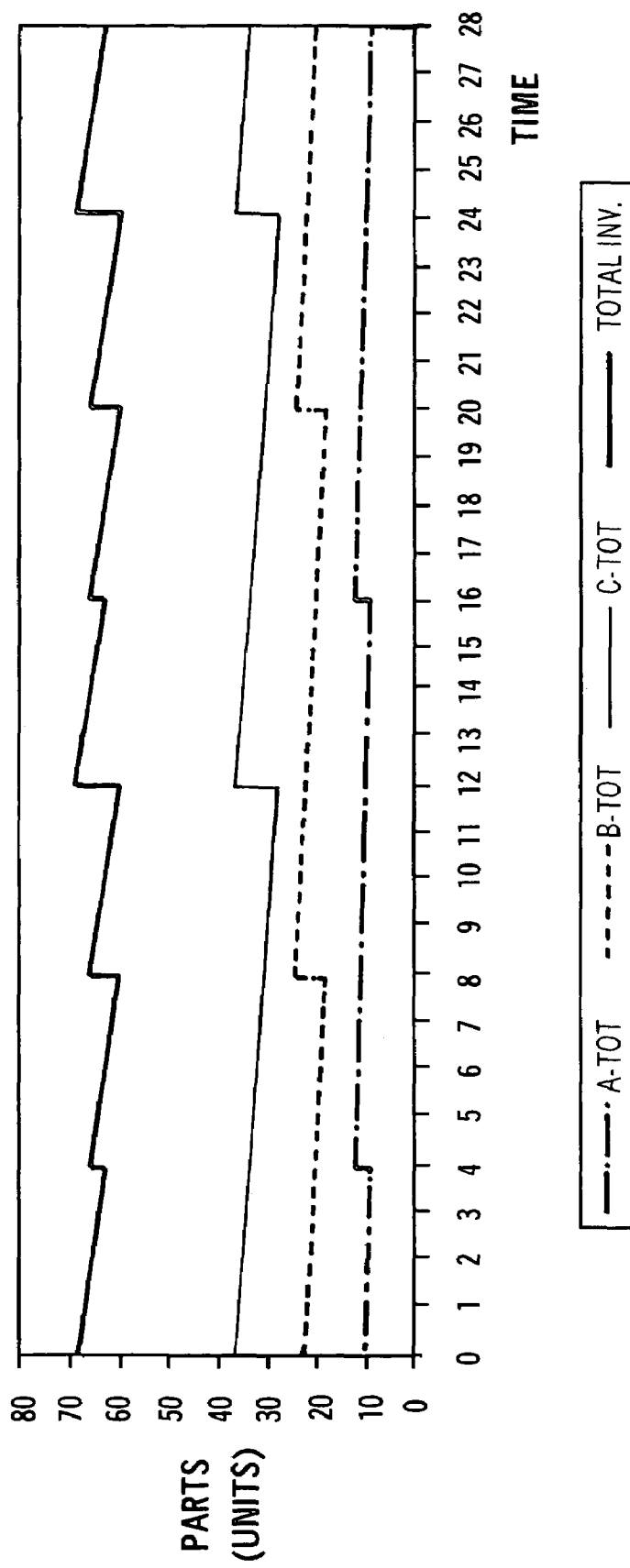
FIG. 24 is a diagram showing aggregate inventory levels for a fully asynchronized production schedule.

The shapes of the raw material and Work In Process inventory profiles are similar to those of the preceding section, with the bases of the trapezoidal sections further enlarged. As before, the shape of the aggregate inventory profile is unchanged, but its level has grown, now varying between 59 and 68 units, roughly three times that of the perfectly synchronized case, as shown in FIG. 24. Real processes typically operate between Case 3 and Case 4, shown by comparison in FIG. 25.

Using the variables defined for equation (1), it is possible to derive equations to determine the Work In Process and finished goods inventory levels in the facility. One may begin by determining the maximum of the workstation turnover times required to produce one (minimum-size) batch of each product at each workstation.

$$WTT_{max} = \underset{j=1,J}{\text{Max}} \left[ \frac{\sum_{i=1}^{N} S_{ij}}{1 - \sum_{i=1}^{N} \lambda_i P_{ij}} \right] \quad (2)$$

Under the generally applied policy of maintaining a consistent processing and transfer batch size for each part/product as it traverses its processing route, one can determine the batch sizes for the N distinct parts/products:

$$MINB_i = \lambda_i \, WTT_{max} = \lambda_i \underset{j=1,J}{\text{Max}} \left[ \frac{\sum_{i=1}^{N} S_{ij}}{1 - \sum_{i=1}^{N} \lambda_i P_{ij}} \right] \quad (3)$$

The inventory profile diagrams and the processing schedules can be used to determine the implied work in process inventory at each workstation, and sum over the workstations to determine the total work in process inventory of part/product i in the facility. These are the inner summations over the index j in equations 4, 5, and 6. Note that one must carry forward the summations in equation (3), embodied in the term $MINB_i$. Summing over the part/product index i yields the average aggregate Work In Process (WIP) inventory in the facility.

$$\text{Perfectly Synchronized Average WIP} = \sum_{i=1}^{N} \left[ \lambda_i \sum_{j=1}^{J} (MINB_i P_{ij}) \right] \quad (4)$$

$$\text{Setup-On-Batch-Arrival Average WIP} = \sum_{i=1}^{N} \left[ \lambda_i \sum_{j=1}^{J} [S_{ij} + (MINB_i P_{ij})] \right] \quad (5)$$

$$\text{Fully Asynchronized Average WIP} = \sum_{i=1}^{N} \left[ \lambda_i \sum_{j=1}^{J} \left( \sum_{i=1}^{N} [S_{ij} + (MINB_i P_{ij})] \right) \right] \quad (6)$$

In a similar fashion, one can use the finished goods inventory profiles and the processing schedules can be used to derive the average aggregate level of finished goods on hand. As indicated in the discussion of the finished goods inventory profiles, the average finished goods inventory is unaffected by the level of synchronization of the production schedule.

$$\text{Average Finished Goods Inventory} = \sum_{i=1}^{N} \frac{1}{2} \lambda_i WTT_{max} = \sum_{i=1}^{N} \frac{1}{2} MINB_i \quad (7)$$

Combining equations 4, 5, and 6 with equation 7 yields the average total inventory in the facility under each of the scheduling scenarios. Again, the value of $MINB_i$ must be computed from equation 3 and inserted in equations 8, 9, and 10. Note that these equations could be factored into a slightly more compact notation, but this would conceal their basic structure as examples of Little's Law, and reduce the comparability across scheduling scenarios.

$$\text{Perfectly Synchronized Average Total Inventory in System} = \sum_{i=1}^{N} \left[ \lambda_i \sum_{j=1}^{J} (MINB_i P_{ij}) \right] + \sum_{i=1}^{N} \frac{1}{2} MINB_i \quad (8)$$

$$\text{Setup-On-Batch-Arrival Average Total Inventory in System} = \sum_{i=1}^{N}\left[\lambda_i \sum_{j=1}^{J}[S_{ij}+(MINB_i P_{ij})]\right] + \sum_{i=1}^{N}\frac{1}{2}MINB_i \quad (9)$$

$$\text{Fully Asynchronized Average Total Inventory in System} = \sum_{i=1}^{N}\left[\lambda_i \sum_{j=1}^{J}\left(\sum_{i=1}^{N}[S_{ij}+(MINB_i P_{ij})]\right)\right] + \sum_{i=1}^{N}\frac{1}{2}MINB_i \quad (10)$$

The complexity of the multiple summations may mask the effects of set-up time and product complexity on the amount of work in process and finished goods inventory maintained in the facility. The roles of these parameters can be highlighted by considering a system in which all parts/products and all workstations are symmetric, i.e., in which the set-up times and processing times per unit are identical for all products and all workstations.

$$\lambda_i = \lambda \text{ for all } i \quad (11)$$

$$P_{ij} = P \text{ for all } i,j \quad (12)$$

$$S_{ij} = S \text{ for all } i,j \quad (13)$$

Recall that the aggregate demand (across all products) is denoted by the symbol $\Lambda$, which was defined in equation (1). With these simplifications, $$\Lambda = \sum_{i=1}^{N} \lambda_i = N\lambda \quad (14)$$

Also note that in order to deliver $\Lambda$ units of product per hour, each of which requires P hours of processing at each sequentially ordered workstation, one must have:

$$0 \leq \Lambda P \leq 1 \quad (15)$$

These parameter values can be substituted to determine the common minimum batch size for all products and the common workstation turnover time for all workstations.

$$MINB = \lambda \left[\frac{\sum_{i=1}^{N} S}{1 - \sum_{i=1}^{N} \lambda P}\right] = \frac{\Lambda S}{1 - \Lambda P} \quad (16)$$

$$WTT = \left[\frac{\sum_{i=1}^{N} S}{1 - \sum_{i=1}^{N} \lambda P}\right] = \frac{NS}{1 - \Lambda P} \quad (17)$$

By successive simplifications (in which all products have the same demand, setup time, processing time/unit, etc.), one can demonstrate the effects of setup time S and part/product count N. Given the definitions:

Scheduling Case = [Work In Process] + [Finished Goods]

$$\text{Perfectly Synchronized Average Total Inventory in System} = \left[\frac{(\Lambda P) J \Lambda S}{1 - \Lambda P}\right] + \left[\frac{N \Lambda S}{2(1 - \Lambda P)}\right] \quad (18)$$

$$\text{Setup-On-Batch-Arrival Average Total Inventory in System} = \left[\frac{J \Lambda S}{1 - \Lambda P}\right] + \left[\frac{N \Lambda S}{2(1 - \Lambda P)}\right] \quad (19)$$

$$\text{Fully Asynchronized Average Total Inventory in System} = \left[\frac{N J \Lambda S}{1 - \Lambda P}\right] + \left[\frac{N \Lambda S}{2(1 - \Lambda P)}\right] \quad (20)$$

From these equations, one can see that the average total inventory in the facility is linear in the setup time S, under all scheduling scenarios. Moreover, the setup time affects the level of both work in process inventories and finished goods inventories. Thus application of the Four Step Rapid Setup Method (Shingo) to radically reduce setup time will reduce inventory and the related non-value add costs. Because setup time is a common factor, its reduction ameliorates the impact of N, J, P and other parameters. However, the effort involved in effecting radical setup reduction when N and J is large can-be prohibitive.

The average Work In Process inventory is linear in the number of distinct workstations, J. Each workstation represents both a position at which a batch of parts/products should be undergoing processing at all times, and a point at which batches awaiting processing can accumulate. One of the fundamental tools of the Lean process improvement initiative is Value Stream Mapping which has been generalized to Complexity Reduction Value Stream Mapping herein. This tool allows improvement activities to then be focused on the non-value add activities and effect their elimination, thus reducing J. As discussed below, real processes tend toward equation (20), hence the reduction of J can significantly reduce inventory and related non-value add costs as well as focusing setup reduction on the reduced number of activities.

The complexity of the facility's part/product portfolio plays a somewhat more subtle role in the equations. The overall total demand rate faced by the facility is represented by the symbol $\Lambda$:

$$\Lambda = \sum_{i=1}^{N} \lambda_i = N\lambda \quad (21)$$

One form of complexity can be modeled as the number of distinct or differentiated parts/products into which the overall demand rate $\lambda$ has been segmented. Here the operational definition of differentiation is a feature of a part or product that necessitates a setup operation at each workstation before a batch can be processed. Thus the magnitude of N denotes the processing complexity. As the right-hand term in equations (18) through (20) indicates, the average finished goods inventory level in the facility is linear in N. Finished goods inventory must be carried in each part/product, and each distinct product contributes another setup and processing interval to the workstation turnover time. Sufficient finished goods must be stocked to satisfy demand over that workstation turnover time.

Equations (18) and (19) indicate that, if the processing schedule is perfectly synchronized or at least very close to perfectly synchronized (setup-on-batch-arrival), the Work In Process inventory is independent of N. The only known case of near perfect synchronization occurred in the Highland Park Model T plant in which N=1. However, as N grows, it becomes more difficult to devise and maintain a perfectly synchronized schedule, and thus the Work In Process inventory will grow. Equation (20) more accurately represents reality, and indicates that the benchmark value of WIP inventory for a fully asynchronized schedule is linear in N in both WIP and Finished Goods, which can be very much greater. Therefore complexity reduction has a major impact on WIP and hence non-value add cost reduction.

Increased Complexity N creates large inventory though its impact on P and S. As N increases, the period between repetitions of any given product increases. If a product is built every hour, learning does not decay. If it is built once per month, a relearning process may result. Thus, as N increases, both the setup time and the processing time per unit increases. The latter can be quite explosive, as it enters into the denominator as 1-$\Lambda$P which approaches zero as $\Lambda$P approaches 1 and hence WIP and Finished Goods approach infinity.

To reduce finished goods inventory and reduce the possibility that Work In Process inventory is unnecessarily large, one could pursue a program of complexity reduction in two ways. First, one can standardize the product portfolio by redesigning products and processes to maximize part commonality across products. One might model such an initiative as reducing N without reducing $\lambda$. That is, the total demand rate faced by the firm would continue at rate $\lambda$ units of product per hour, but with fewer different parts embodied in those products. In that case, one might expect a linear reduction in finished goods inventory and a simplified scheduling regime.

Second, one could rationalize the product portfolio by ceasing to supply those products whose individual demand rates $\lambda_i$ are small, but whose processing ultimately requires increased inventory levels of all products (not just product i) to provide sufficient productive capacity for their manufacture. In this case, equations (18) through (20) still are indicative of the inventory reductions that could be achieved, but it can no longer be assumed that the aggregate demand rate $\lambda$ would remain constant.

Equations (18) through (20) made the simplifying assumption that all products had the same demand, setup time, etc. But what is the impact of Pareto Demand, in which 80% of the different products or services only constitute 20% of the demand? To conduct an analysis of a typical manufacturing facility or service process, one must use the specific setup time, processing time, and demand which differs for each product or offering. Due to the complex nature of the offering, this may run to thousands or tens of thousands of pieces of data, most of which are available on ERP systems. A computer program may be constructed to execute the logic embodied in equations (2) through (6) which allow real demand, setup time, etc to be used. Such a program, which may be called Supply Chain Accelerator (SCA), will calculate the minimum safe batch size (MBS), and the average total WIP. Inherent in equations (2) through (6) is the assumption of perfect synchronization of the facility, and the examples given herein focus on a small number of similar parts, allowing this perfect synchronization to be achieved. However, in the case of a more complex facility with many parts and workstations, all with very different demand rates, processing and setup rates, scrap rate, etc., the assumption of perfect synchronization of the facility can no longer be assumed. In this case, the deterministic model of the facility outlines in equations (2) through (6) must give way to a stochastic model that is able to capture the imperfections in scheduling that occur in a complex factory.

To build these stochastic models of facilities, a second software program called Process Cycle Simulator (PCS) may be developed. PCS relies on discrete event simulation to simulate the running of the facility for many years. Statistics are collected indicating the level of WIP and finished goods that are held, as well as the service level attained. The simulation models are started with the minimum safe batch sizes determined by SCA, with a portion of capacity held in reserve in the SCA model to allow for the imperfections of scheduling in a complex facility. PCS is run with the output of SCA, the statistical results are observed, and if necessary, additional runs of the PCS are executed with modified minimum safe batch sizes in order to arrive at the proper balance of service level and WIP desired by management.

PCS also has the ability to add random variation to all of the input parameters of equations (2) through (6). This allows the user to add another dimension of reality to the modeling exercise, namely variation. As all processes experience some degree of variation, the ability of PCS to model this variation and determine its effect on service level and WIP further strengthens the suite of tools developed to model, understand, and attack complexity.

To demonstrate this process, a PCS model may be built of a facility that represents only a small increase in complexity over the facility that was the basis of equations (2) through (6). In this facility, there is still only a single workstation, but the number of parts being processed by that workstation have been increased to sixteen. Furthermore, while the setup and processing times remain constant for all parts in the facility, two different demand rates are utilized. The low demand parts—"Slow Movers"—are each given just 1.5% of total demand. The number of Slow Movers is varied from one to fifteen. The high demand parts—"Fast Movers"—are given the remainder of the demand to be split equally amongst the parts. The range of models considered was the following: two to fifteen Fast Movers, and zero to fourteen Slow Movers. Each combination of these parameters was examined, as shown in FIGS. 26 and 27. From the table of FIGS. 26 and 27, the dramatic effect of the addition of just this small amount of complexity can be seen. For example, in the case of five Fast Movers and no Slow Movers, the base WIP calculation is 2500. Recall that demand is kept constant across all parts. So, with total demand unchanged, the addition of eleven Slow Mover parts to the factory causes the new WIP calculation to more than double to 5747. Thus these eleven low demand (slow moving) part numbers effectively double the Work In Process.

Referring to FIG. 5, such an increase in WIP could drive the enterprise far up the Cost of Goods Sold curve. This in turn would mean that the related costs as determined in a CVSM would have to be borne by the eleven products. Activity Based Costing would, in principle, come to the same conclusion, and might suggest that these eleven products were in fact not earning their cost of capital and should be eliminated. The point of departure is based on the strategy of continuous improvement. Cost of complexity reduction would suggest that the eleven products be evaluated in terms of potential value creation. Assume that all setup times could be cut in half. According to Equation (20) WIP and Finished Goods would be cut in half, moving the Non-value add Cost of Goods Sold down the curve. If at this lower overhead rate a product could more than earn its cost of capital, it should be retained. Otherwise it is a candidate for outsourcing or removal. Thus a focused process improvement process can yield higher value when directed by cost of complexity analysis that is hidden from both traditional accounting and activity based costing.

Figure 28:
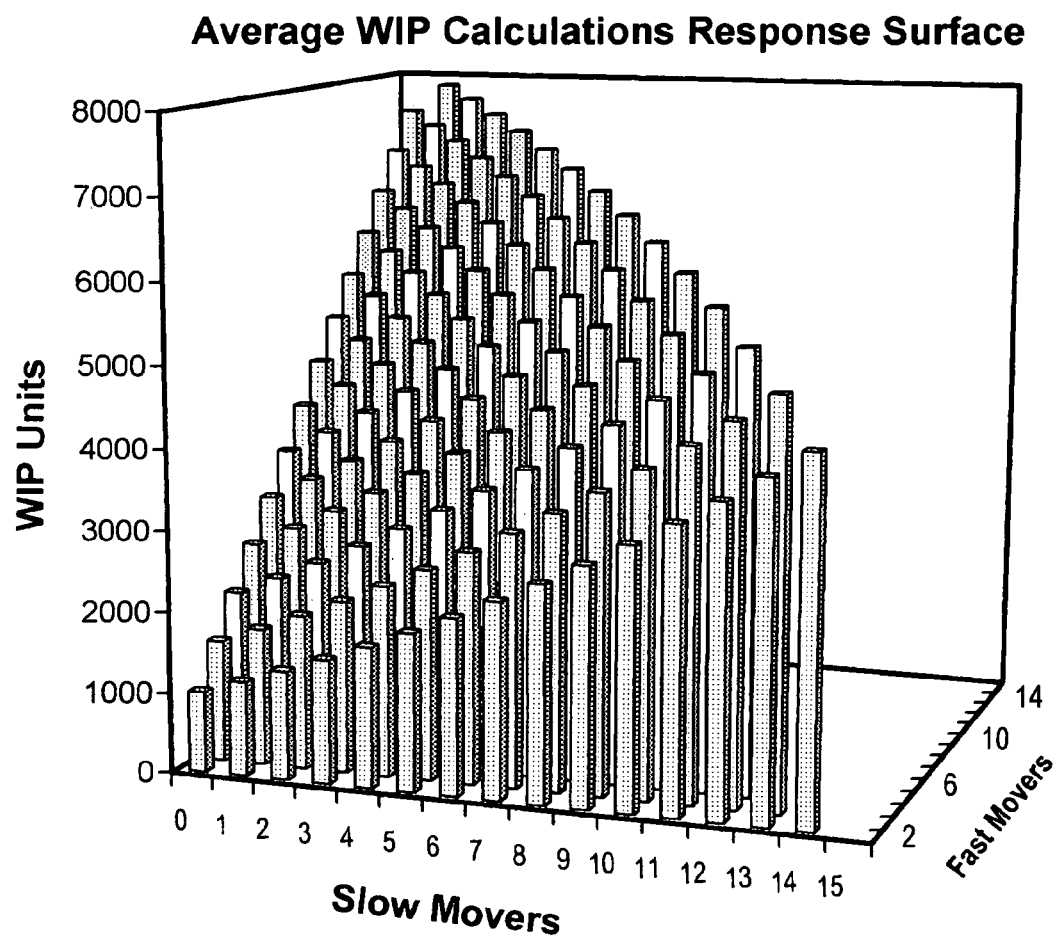
FIG. 28 is a diagram showing the relationship between Fast Movers and Slow Movers as a function of Work In Process units.

Recall that the values in FIG. 8 represent the WIP generated under the assumption of perfect synchronization of schedules. FIG. 28 shows the response surface generated by the values in FIG. 8.

Figure 29:
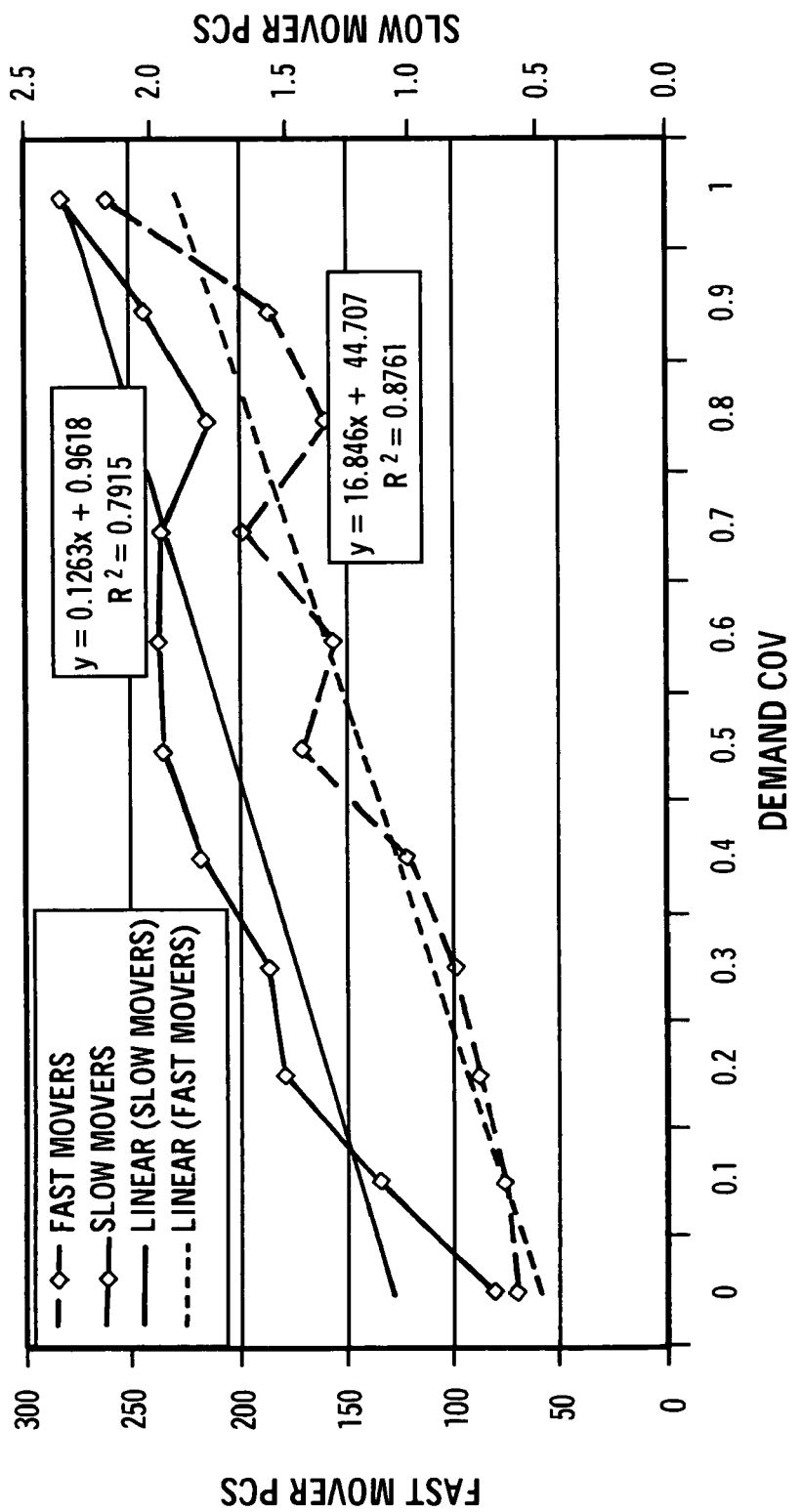
FIG. 29 is a diagram indicating average backlog with demand variation.
Figure 30:
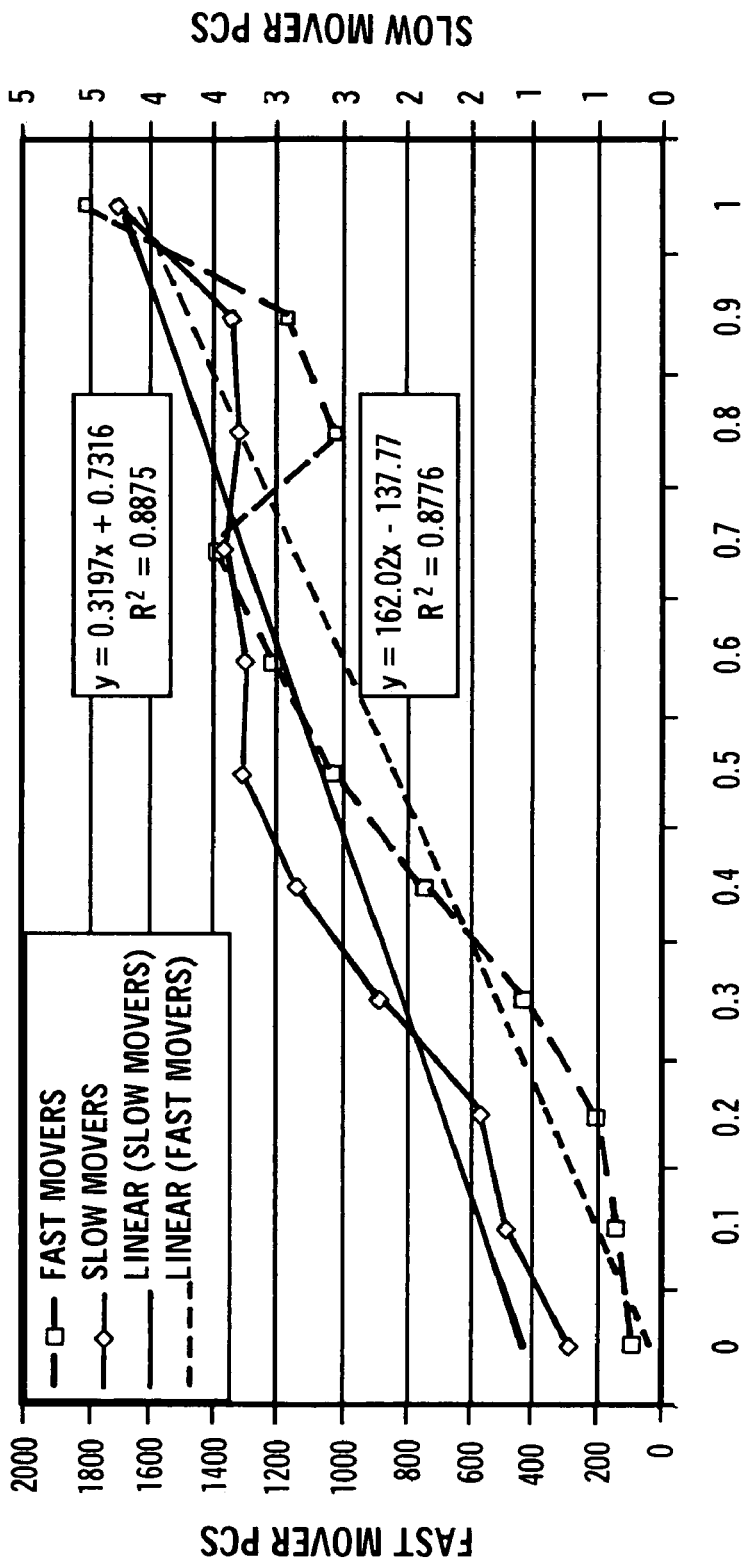
FIG. 30 is a diagram indicating average backlog with setup/processing variations.

Using discrete event simulation without Process Cycle Simulator, the effects of synchronization imperfects and variation can be observed. For the case of three Fast-Mover parts and two Slow Mover parts, the base calculation of WIP with perfect synchronization and no variation is 1903 pieces. In this case, the backlog of demand that was not able to be fulfilled is zero, and the service level is 100%. FIGS. 29 and 30 show the effect on average backlog (average unfulfilled orders) when synchronization and variation are added to the model.

FIG. 29 clearly shows that even with no variation (Demand COV or Coefficient of Variation=0), an average backlog of about seventy five pieces results purely from synchronization difficulties. When demand variation is added as seen by the Demand COV values on the x-axis, the average backlog increases dramatically. Since these simulations were performed with the minimum safe batch sizes calculated from equations (2) through (6), the WIP value has remained relatively constant (with a small allowance for the variation in the model) at 1903, yet the service level has dropped dramatically. In order to return to a service level of approximately 98%, one would need to add WIP equal to three times the average backlog amount. This is based on the assumption of normality in the variation of demand, and three standard deviations to the right of the mean encompassing approximately 98% of the area of the normal curve. In the case of FIG. 29 with a COV of 0.5, that would indicate raising average WIP from 1903 to about 2500 pieces.

FIG. 30 shows the effect of setup and processing time variation on average backlog. Here, the effects of variation are even more pronounced that those observed for demand variation. Looking again at the case of the COV=0.5, the average backlog becomes about 1200 pieces. Relying on the assumption of normality once again, the average WIP would need to increase from 1903 to about 5500 pieces to maintain an approximate 0.98% service level guarantee.

The facility modeled by these simulation exercises represents a very small increment in complexity, three Fast Mover parts and two Slow Mover parts, relative to situations that are typically encountered in industry where one may easily be working with hundreds or thousands of parts across dozens of workstations. Clearly, the adverse effects of complexity are visible in equations 2 through 6. When the assumption of perfect synchronization is relaxed, the effects become even worse. When the reality of variation is then added to the modeling exercise, the effects of complexity become nearly intolerable. Yet, many businesses face this challenge on a daily basis. The purpose of the equations derived herein, are to help determine the magnitude of the problem that a facility faces, determine the best course of action to correct that problem, and estimate the benefits that the facility will enjoy once the complexity problem is resolved.

Figure 31:
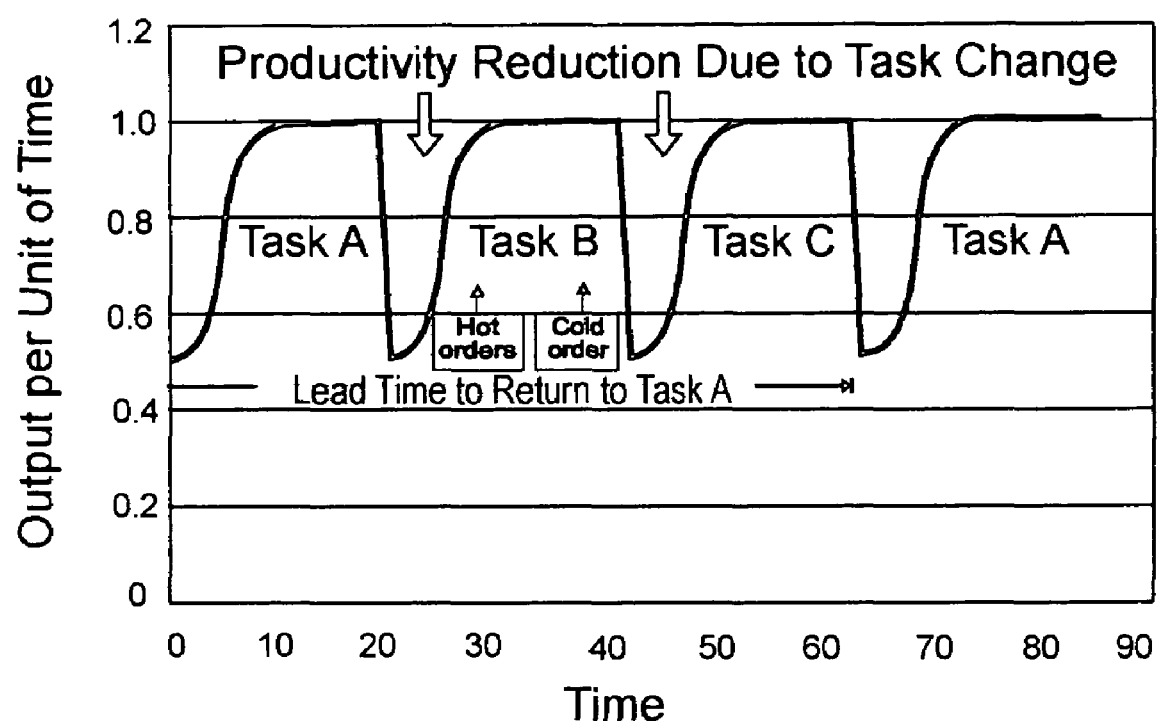
FIG. 31 is a diagram indicating how lead time is lengthened by the learning curve when changing tasks.

The equations have been developed using easy-to-visualize manufacturing examples. But the methodology and Little's Law apply to all processes. Consider the application to procurement. A centralized procurement operation purchased products for fourteen separate operating units each with its own legacy computer system. Each operating unit called a given component by a different name, used different (multiple) screens from which to buy, etc. A commodity buyer would log on to a given units computer, then re-learn the process of procurement. During this learning process, productivity would be low. Because this learning period acted like setup time, the buyer would stay locked on to an operating units requirements until all were purchased, typically taking up to two days. With fourteen operating units, the Cycle Time Interval was twenty-eight days. Ideally the buyer would only place the required "hot" orders, and then log on to another site. This would have led to very low productivity and the need to hire more buyers. Low productivity would mean a longer Processing time per unit P. FIG. 31 depicts the process. According to equation (20) this non-value add cost would have been disclosed by larger inventory since 1-ΛP appears in the denominator. The solution chosen was three fold:

1. Eliminate Setup time: a database was setup to poll all operating units during the evening hours and prepare a corporate wide. "hot list" for the buyer, with consolidated buys leading to 10% lower material cost and the number of buyers reduced 50%.
2. Standardization: The process of buying was made uniform by placing commodities on "contract" such that the supplier had already agreed to price and delivery, making the buy a "point and click" operation rather than a different task for each buy.
3. Cycle time: by only buying "hot" items, the Work In Process by a factor of twenty and cycle time to serve each operating unit was reduced below two days.

The complexity was not reduced. The same number of different part numbers existed. But the transparent, non-value add, cost of buying each commodity separately was eliminated, and the cost of each commodity was reduced by standardization, reducing the cost of complexity.

What is claimed is:

1. A computer implemented method for reducing the work in process at a given time in the manufacture of one of a product and a series of products by comparing process activity parameters including process setup time and process time per product unit, with the number of different product part numbers processed, changing at least one of said process activity parameters to reduce said work in process, said method including the steps of:

determining, by a computer, the aggregate demand in product units per hour based on the number of different product units produced at a facility multiplied by the customer demand rate for respective product units per hour;

determining, by a computer, the common minimum batch size for all product units (MINB) for all workstations from the equation:

$$MINB = \lambda \left[ \frac{\sum_{i=1}^{N} S}{1 - \sum_{i=1}^{N} \lambda P} \right] = \frac{\Lambda S}{1 - \Lambda P}$$

where $\lambda$ is the customer demand rate, N is the number of different product part numbers (from i to N), $\Lambda$ is the aggregate demand for all product units produced in the facility, S is the setup time required to prepare a workstation to produce a batch of product units and P is the time required to process one product unit at the workstation in question; and reducing said work in process by selective reduction of at least one of said product part numbers, said process setup time and said process time per product unit.

2. The method set forth in claim 1 including the step of: comparing the non value added cost of process time per product unit with the number of product part numbers being processed.

3. The method set forth in claim 2 including the step of: determining the common workstation turnover time (WTT) for all workstations processing N product part numbers from the equation:

$$WTT = \frac{NS}{1 - \Lambda P}$$

wherein all product units have the same demand, setup time and process time per product unit.

4. The method set forth in claim 3 including the step of: comparing the non value added cost of defective product units with the number of product part numbers being produced.

5. The method set forth in claim 3 including the step of: comparing the non value added cost of demand in product units per unit of time with the number of product part numbers being processed.

6. The method set forth in claim 3, including the step of: determining the average total system inventory in a facility for perfectly synchronized average Work In Process from the equation:

$$\left[ \frac{(\Lambda P) J \Lambda S}{1 - \Lambda P} \right] + \left[ \frac{N \Lambda S}{2(1 - \Lambda P)} \right]$$

wherein all product units have the same demand, setup time and process time per product unit.

7. The method set forth in claim 3 including the step of: determining the average total system inventory in a facility for setup-on-batch-arrival average Work In Process from the equation:

$$\left[ \frac{J \Lambda S}{1 - \Lambda P} \right] + \left[ \frac{N \Lambda S}{2(1 - \Lambda P)} \right]$$

wherein all product units have the same demand, setup time and process time per product unit.

8. The method set forth in claim 3 including the step of: determining the average total system inventory in a facility for fully asynchronized average Work In Process from the equation:

$$\left[ \frac{N J \Lambda S}{1 - \Lambda P} \right] + \left[ \frac{N \Lambda S}{2(1 - \Lambda P)} \right]$$

wherein all product units have the same demand, setup time and process time per product unit.

9. A computer implemented method for reducing the work in process at a given time in the manufacture of one of a product and a series of products by comparing process activity parameters including process setup time, processing time per product unit and the number of different product part numbers processed, at one or more workstations, including the steps of:

determining, by a computer, maximum workstation turnover time to produce one minimum size batch of each product at each workstation ($WTT_{max}$) from the equation:

$$WWT_{max} = \max_{j=1,J} \left[ \frac{\sum_{i=1}^{N} S_{ij}}{1 - \sum_{i=1}^{N} \lambda_i P_{ij}} \right]$$

wherein, i=part product index (i=1, . . . , N) and N is the total number of different parts or products, j equals the workstation (j=1, . . . , J), J is the number of distinct workstations, $\lambda_i$ is the customer demand rate for part product i in units per hour, $S_{ij}$ is the setup time required to prepare workstation j to produce a batch of part/product i and $P_{ij}$ is the time required to process one unit of part/product i at workstation j; and changing selected ones of said process activity parameters to reduce said workstation turnover time.

10. A computer implemented method for reducing the work in process at a given time in the manufacture of one of a product and a series of products by comparing process activity parameters including process setup time, processing time per product unit and the number of different product part numbers processed, at one or more workstations, including the steps of:

determining, by a computer, the batch size (MINB$_i$) for N products from the equation:

$$MINB_i = \lambda_i WWT_{max} = \lambda_i \underset{j=1,J}{Max}\left[\frac{\sum_{i=1}^{N} S_{ij}}{1 - \sum_{i=1}^{N} \lambda_i P_{ij}}\right]$$

wherein, i=part product index (i=1, ..., N) and N is the total number of different parts or products, j equals the workstation (j=1, ..., J), J is the number of distinct workstations, $\lambda_i$ is the customer demand rate for part product i in units per hour, $S_{ij}$ is the setup time required to prepare workstation j to produce a batch of part/product i and $P_{ij}$ is the time required to process one unit of part/product i at workstation j; and changing selected ones of said process activity parameters to reduce said work in process.

\* \* \* \* \*